US011229832B2

(12) United States Patent
Sadick et al.

(10) Patent No.: US 11,229,832 B2
(45) Date of Patent: Jan. 25, 2022

(54) OVERLAY SYSTEMS AND METHODS OF INSTALLING OVERLAY SYSTEMS

(71) Applicant: RS Sports Surfaces, LLC, Seymour, CT (US)

(72) Inventors: Timothy Sadick, Seymour, CT (US); David Rich, Oxford, CT (US)

(73) Assignee: RS Sports Surfaces, LLC, Seymour, CT (US)

(*) Notice: Subject to any disclaimer, the term of this patent is extended or adjusted under 35 U.S.C. 154(b) by 0 days.

(21) Appl. No.: 17/193,635

(22) Filed: Mar. 5, 2021

(65) Prior Publication Data

US 2021/0187381 A1 Jun. 24, 2021

Related U.S. Application Data

(63) Continuation of application No. 15/836,857, filed on Dec. 9, 2017.
(Continued)

(51) Int. Cl.
A63C 19/12 (2006.01)
B32B 5/02 (2006.01)
(Continued)

(52) U.S. Cl.
CPC .............. A63C 19/12 (2013.01); A63C 19/02 (2013.01); A63C 19/04 (2013.01); A63C 19/065 (2013.01); B32B 3/06 (2013.01); B32B 3/18 (2013.01); B32B 5/022 (2013.01); B32B 5/024 (2013.01); B32B 5/028 (2013.01); B32B 5/16 (2013.01); B32B 5/26 (2013.01); B32B 7/12 (2013.01); B32B 13/04 (2013.01); B32B 25/04 (2013.01); B32B 27/06 (2013.01); B32B 27/302 (2013.01); B32B 27/308 (2013.01); B32B 37/12 (2013.01); B32B 37/18 (2013.01); E01C 13/045 (2013.01); B32B 37/24 (2013.01); B32B 2038/0064 (2013.01); B32B 2262/101 (2013.01); B32B 2264/102 (2013.01); B32B 2305/38 (2013.01); (Continued)

(58) Field of Classification Search
CPC .......... E01C 13/00; E01C 13/06; B32B 5/22; A01G 1/00; A63C 19/12
See application file for complete search history.

(56) References Cited

U.S. PATENT DOCUMENTS 3,801,421 A * 4/1974 Allen ................... E01C 13/065
428/17
3,974,312 A 8/1976 Stevens et al.
(Continued)

OTHER PUBLICATIONS

U.S. Appl. No. 62/431,955.

Primary Examiner — Eugene L Kim
Assistant Examiner — Christopher Glenn
(74) Attorney, Agent, or Firm — Akerman LLP

(57) ABSTRACT

A method of installing a binder-based overlay system may include contacting a layer of geotextile fabric to a surface of a substrate and applying a primer layer to a surface of the geotextile fabric. Two or more binder layers including infill particles may be applied over the primer layer. A resurfacer layer followed by one or more color layers may be applied over the two or more binder layers. The primer layer, one or more binder layers, resurfacer layer, and two or more color layers may cure upon application to form a monolithic layer upon the substrate.

17 Claims, 5 Drawing Sheets

Related U.S. Application Data

(60) Provisional application No. 62/431,955, filed on Dec. 9, 2016.

(51) Int. Cl.

| | | |
|---|---|---|
| *B32B 5/26* | (2006.01) | |
| *B32B 7/12* | (2006.01) | |
| *B32B 5/16* | (2006.01) | |
| *B32B 13/04* | (2006.01) | |
| *B32B 25/04* | (2006.01) | |
| *B32B 27/06* | (2006.01) | |
| *B32B 27/30* | (2006.01) | |
| *B32B 3/06* | (2006.01) | |
| *B32B 37/12* | (2006.01) | |
| *B32B 37/18* | (2006.01) | |
| *B32B 3/18* | (2006.01) | |
| *A63C 19/04* | (2006.01) | |
| *A63C 19/06* | (2006.01) | |
| *E01C 13/04* | (2006.01) | |
| *A63C 19/02* | (2006.01) | |
| *B32B 37/24* | (2006.01) | |
| *B32B 38/00* | (2006.01) | |

(52) U.S. Cl.
CPC ....... *B32B 2315/06* (2013.01); *B32B 2319/00* (2013.01); *B32B 2333/00* (2013.01); *B32B 2419/04* (2013.01); *B32B 2471/00* (2013.01); *B32B 2471/04* (2013.01)

(56) References Cited

U.S. PATENT DOCUMENTS

| | | |
|---|---|---|
| 4,336,286 A | 6/1982 | Tomarin |
| 4,396,653 A | 8/1983 | Tomarin |
| 4,601,925 A | 7/1986 | Hsu |
| 4,606,963 A * | 8/1986 | Farrell ................. E01C 13/065 404/17 |
| 5,041,320 A | 8/1991 | Meredith et al. |
| 5,190,811 A | 3/1993 | Rossi |
| 5,411,352 A * | 5/1995 | Eren ................. E01C 13/065 404/31 |
| 5,578,357 A | 11/1996 | Fink |
| 5,678,951 A | 10/1997 | Levasseur |
| 5,728,444 A | 3/1998 | Fink |
| 5,876,827 A | 3/1999 | Fink |
| 6,221,445 B1 | 4/2001 | Jones |
| 6,299,959 B1 | 10/2001 | Squires |
| 6,338,885 B1 | 1/2002 | Prevost |
| 6,375,546 B1 | 4/2002 | Lemieux |
| 6,472,041 B1 | 10/2002 | Burke |
| 6,527,889 B1 | 3/2003 | Paschal et al. |
| 6,602,113 B2 | 8/2003 | Lemieux |
| 6,723,412 B2 | 4/2004 | Prevost |
| 6,740,387 B1 | 5/2004 | Lemieux |
| 6,786,674 B1 | 9/2004 | Hanks |
| 6,796,096 B1 * | 9/2004 | Heath ................. B32B 5/26 428/15 |
| 6,966,841 B1 | 11/2005 | Sherman |
| 7,168,883 B2 | 1/2007 | Waterford |
| 7,186,450 B2 | 3/2007 | Foxon |
| 7,198,427 B2 | 4/2007 | Carr et al. |
| 7,279,212 B2 | 10/2007 | Foxon |
| 7,338,698 B1 | 3/2008 | Bieser et al. |
| 7,387,823 B2 | 6/2008 | Waterford |
| 7,713,133 B2 | 5/2010 | Wolf |
| 7,910,194 B2 | 3/2011 | Bieser et al. |
| 8,186,117 B2 | 5/2012 | Eren |
| 8,283,017 B2 | 10/2012 | Bieser et al. |
| 8,496,769 B2 | 7/2013 | Brumbelow et al. |
| 9,051,683 B2 | 6/2015 | Brumbelow et al. |
| 2003/0039773 A1 | 2/2003 | Yao |
| 2004/0209038 A1 * | 10/2004 | Foxon ................. B32B 5/26 428/86 |
| 2004/0247822 A1 * | 12/2004 | Foxon ................. E01C 13/08 428/95 |
| 2004/0253410 A1 * | 12/2004 | Higgins ................. B32B 5/18 428/96 |
| 2005/0064112 A1 | 3/2005 | Nicholls |
| 2005/0089678 A1 | 4/2005 | Mead |
| 2008/0104914 A1 | 5/2008 | Lemieux |
| 2009/0186716 A1 * | 7/2009 | Lancia ................. A63B 67/02 473/157 |
| 2009/0293398 A1 * | 12/2009 | Eren ................. E01D 19/083 52/403.1 |
| 2009/0312154 A1 * | 12/2009 | Harris ................. A63B 6/00 482/35 |
| 2010/0170991 A1 * | 7/2010 | Hobbs ................. D05C 17/02 244/129.2 |
| 2010/0173116 A1 | 7/2010 | Bainbridge |
| 2014/0169877 A1 | 6/2014 | Reising et al. |
| 2015/0376844 A1 * | 12/2015 | Palau Gea ............. A01G 9/033 428/17 |
| 2016/0160451 A1 * | 6/2016 | Lewis ................. B29C 66/3474 428/17 |
| 2018/0200608 A1 | 7/2018 | Sadick |

* cited by examiner

OVERLAY SYSTEMS AND METHODS OF INSTALLING OVERLAY SYSTEMS

CROSS-REFERENCES TO RELATED PATENT APPLICATION

This application is a continuation of U.S. patent application Ser. No. 15/836,857, filed Dec. 9, 2017, which claims priority to U.S. Provisional Application No. 62/431,955, filed Dec. 9, 2016. U.S. patent application Ser. No. 15/836,857 and U.S. Provisional Application No. 62/431,955 are hereby incorporated herein by reference in their entirety.

BACKGROUND

Tennis courts, basketball courts, volleyball courts, running tracks, and other athletic playing surfaces deteriorate over time. To wit, these courts and surfaces develop cracks and other deformations (e.g., "low spots", "high spots", "dead spots", etc.). These deformations affect the quality of athletic activity or performance and pose an injury threat to participants. Thus, development of cracks and other deformations requires continuous maintenance. Despite advances in the understanding of the construction and maintenance of athletic courts and playing surfaces, there still exists a need for customizable overlay systems that provide superior durability, improved planarity, and comfort for all participants.

BRIEF SUMMARY

Disclosed herein are binder-based overlay systems.

Disclosed herein is a binder-based overlay system comprising a layer of seaming material; a layer of geotextile fabric; a primer layer adhered to the layer of geotextile fabric; one or more binder layers comprising sand, rubber, or a rubber alternative, or a combination thereof adhered to the primer layer; a resurfacer layer; a first color layer; a second color layer; and playing lines. Disclosed herein is a binder-based overlay system comprising a layer of seaming material; a layer of geotextile fabric; a primer layer adhered to the layer of geotextile fabric; one or more binder layers comprising sand, rubber, or a rubber alternative, or a combination thereof adhered to the primer layer; a first resurfacer layer; a second resurfacer layer; a first color layer; a second color layer; and playing lines. Disclosed herein is a binder-based overlay system comprising a layer of geotextile fabric; a primer layer adhered to the layer of geotextile fabric; one or more binder layers comprising sand, rubber, or a rubber alternative, or a combination thereof adhered to the primer layer; a resurfacer layer; a first color layer; a second color layer; and playing lines. Disclosed herein is a binder-based overlay system comprising a layer of seaming material; a layer of geotextile fabric; a primer layer adhered to the layer of geotextile fabric; one or more binder layers comprising sand, rubber, or a rubber alternative, or a combination thereof adhered to the primer layer; a first resurfacer layer; a first color layer; a second color layer; and playing lines. Disclosed herein is a binder-based overlay system comprising a layer of seaming material; a layer of geotextile fabric; a primer layer; one or more binder layers; a first resurfacer layer; a second resurfacer layer; a first color layer; a second color layer; and playing lines. Disclosed herein is a binder-based overlay system comprising a layer of geotextile fabric; a primer layer; one or more binder layers; one or more resurfacer layers; one or more color layers; and playing lines. Disclosed herein is a binder-based overlay system comprising a layer of seaming material; layer of geotextile fabric; a primer layer; between 1-8 binder layers; two or more resurfacer layers; two or more color layers; and playing lines. Disclosed herein is a binder-based overlay system comprising a layer of geotextile fabric; a primer layer; and one or more binder layers. Disclosed herein is a binder-based overlay system comprising a layer of geotextile fabric; a primer layer; and two or more binder layers. Disclosed herein is a binder-based overlay system comprising: a layer of seaming material; a layer of geotextile fabric; a primer layer; and one or more binder layers. Disclosed herein is a binder-based overlay system comprising a layer of seaming material; a layer of geotextile fabric; a primer layer; and two or more binder layers. Disclosed herein is a binder-based overlay system comprising a layer of seaming material; a layer of geotextile fabric; two or more primer layers; and two or more binder layers. Disclosed herein is a binder-based overlay system comprising a layer of geotextile fabric; two or more primer layers; and two or more binder layers. Disclosed herein is a binder-based overlay system comprising a layer of geotextile fabric; a primer layer adhered to the layer of geotextile fabric; and one or more binder layers adhered to the primer layer. Disclosed herein is a binder-based overlay system comprising a layer of seaming material; a layer of geotextile fabric; a primer layer adhered to the layer of geotextile fabric; and one or more binder layers adhered to the primer layer. Disclosed herein is a binder-based overlay system comprising a layer of geotextile fabric; a primer layer adhered to the layer of geotextile fabric; and two or more binder layers adhered to the primer layer. Disclosed herein is a binder-based overlay system, comprising a layer of seaming material; a layer of geotextile fabric; a primer layer adhered to the layer of geotextile fabric; and two or more binder layers adhered to the primer layer. Disclosed herein is a binder-based overlay system comprising a layer of seaming material; a layer of geotextile fabric; two or more primer layers adhered to the layer of geotextile fabric; and two or more binder layers adhered to the two or more primer layers. Disclosed herein is a binder-based overlay system comprising a layer of geotextile fabric; two or more primer layers adhered to the layer of geotextile fabric; and two or more binder layers adhered to the two or more primer layers.

Disclosed herein are methods of installing a binder-based overlay systems.

Disclosed herein is a method of installing a binder-based overlay system comprising correcting one or more deformations in the existing substrate; contacting a layer of geotextile fabric to a surface of a substrate; applying one or more primer layers to a surface of the geotextile fabric; adding one or more binder layers; applying two or more resurfacer layers; applying two or more color layers; and providing playing lines on the surface of the overlay. Disclosed herein is a method of installing a binder-based overlay system comprising contacting a layer of geotextile fabric to a surface of a substrate; applying one or more primer layers to a surface of the geotextile fabric; adding one or more binder layers; applying two or more resurfacer layers; applying two or more color layers; and providing playing lines on the surface of the overlay. Disclosed herein is a method of installing a binder-based overlay system comprising correcting one or more deformations in the existing substrate; contacting a layer of geotextile fabric to a surface of a substrate; applying one or more primer layers to a surface of the geotextile fabric; adding one or more binder layers to the one or more primer layers; applying two or more resurfacer layers to the one or more binder layers;

applying two or more color layers to the two or more resurfacer layers; and providing playing lines on the surface of the overlay. Disclosed herein is a method of installing a binder-based overlay system comprising contacting a layer of geotextile fabric to a surface of a substrate; applying one or more primer layers to a surface of the geotextile fabric; adding one or more binder layers to the one or more primer layers; applying two or more resurfacer layers to the one or more binder layers; applying two or more color layers to the two or more resurfacer layers; and providing playing lines on the surface of the overlay.

Disclosed herein is a method of installing a binder-based overlay system comprising: correcting one or more deformations in the existing substrate; contacting a layer of geotextile fabric to a surface of a substrate; applying one or more primer layers to a surface of the geotextile fabric; adding one or more binder layers to the one or more primer layers; applying one or more resurfacer layers to the one or more binder layers; applying one or more color layers to the one or more resurfacer layers; and providing playing lines on the surface of the overlay. Disclosed herein is a method of installing a binder-based overlay system comprising contacting a layer of geotextile fabric to a surface of a substrate; applying one or more primer layers to a surface of the geotextile fabric; adding one or more binder layers to the one or more primer layers; applying one or more resurfacer layers to the one or more binder layers; applying one or more color layers to the one or more resurfacer layers; and providing playing lines on the surface of the overlay. Disclosed herein is a method of installing a binder-based overlay system comprising correcting one or more deformations in the existing substrate; contacting a layer of geotextile fabric to a surface of a substrate; applying one or more primer layers to a surface of the geotextile fabric; adding one or more binder layers; applying one or more resurfacer layers; applying one or more color layers; and providing playing lines on the surface of the overlay. Disclosed herein is method of installing a binder-based overlay system comprising contacting a layer of geotextile fabric to a surface of a substrate; applying one or more primer layers to a surface of the geotextile fabric; adding one or more binder layers; applying one or more resurfacer layers; applying one or more color layers; and providing playing lines on the surface of the overlay. Disclosed herein is a method of installing a binder-based overlay system comprising partially or substantially adhering a layer of geotextile fabric to the surface of a substrate; applying a primer layer; and adding one or more binder layers. Disclosed herein is a method of installing a binder-based overlay system, comprising: correcting one or more deformations in an existing substrate; partially or substantially adhering a layer of geotextile fabric to the surface of a substrate; applying a primer layer; and adding one or more binder layers. Disclosed herein is a method of installing a binder-based overlay system comprising correcting one or more deformations in the substrate; seaming two or more pieces of geotextile fabric to the substrate to create a layer of seamed geotextile fabric; partially or substantially adhering two or more pieces of geotextile fabric to the substrate; applying one or more primer layers; adding one or more binder layers; applying one or more resurfacer layers; applying one or more color layers; and providing playing lines on the surface of the overlay.

Disclosed herein are infill-based overlay systems.

Disclosed herein is an infill-based overlay system, comprising: a layer of geotextile fabric; an adhesive layer; and an infill layer. Disclosed herein is an infill-based overlay system, comprising: a layer of seaming material; a layer of geotextile fabric; an adhesive layer; and an infill layer. Disclosed herein is an infill-based overlay system, comprising: at least one layer of geotextile fabric; at least one adhesive layer; and at least one infill layer. Disclosed herein is an infill-based overlay system, comprising: at least one layer of geotextile fabric; at least one adhesive layer; and at least two infill layers. Disclosed herein is an infill-based overlay system, comprising: a layer of geotextile fabric; three adhesive layers; and two infill layers. Disclosed herein is an infill-based overlay system, comprising: a layer of geotextile fabric; four adhesive layers; and three infill layers. Disclosed herein is an infill-based overlay system, comprising: at least two layers of geotextile fabric; at least one adhesive layer; and at least one infill layer. Disclosed herein is an infill-based overlay system, comprising: a layer of geotextile fabric partially or substantially adhered to a substrate; an adhesive layer applied to the layer of geotextile fabric; and an infill layer. Disclosed herein is an infill-based overlay system, comprising: a layer of geotextile fabric partially or substantially adhered to a substrate; an adhesive layer applied to the layer of geotextile fabric; and an infill layer comprising sand, rubber, or a rubber alternative, or a combination thereof adhered to the adhesive layer. Disclosed herein is an infill-based overlay system, comprising: a layer of seaming material; a layer of geotextile fabric partially or substantially adhered to a substrate; an adhesive layer applied to the layer of geotextile fabric; and an infill layer comprising sand, rubber, or a rubber alternative, or a combination thereof adhered to the adhesive layer. Disclosed herein is an infill-based overlay system, comprising: a layer of geotextile fabric partially or substantially adhered to a substrate; a first adhesive layer applied to the layer of geotextile fabric; an infill layer comprising sand, rubber, or a rubber alternative, or a combination thereof adhered to the adhesive layer; a second adhesive layer applied to the infill layer; and at least one layer of a resurfacer. Disclosed herein is an infill-based overlay system, comprising: a layer of geotextile fabric partially or substantially adhered to a substrate; a first adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; and a second layer of a resurfacer. Disclosed herein is an infill-based overlay system, comprising: a layer of geotextile fabric partially or substantially adhered to a substrate; a first adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; a second layer of a resurfacer; and at least one layer of a color. Disclosed herein is an infill-based overlay system, comprising: a layer of geotextile fabric partially or substantially adhered to a substrate; an adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; a second layer of a resurfacer; a first layer of a color; and a second layer of a color. Disclosed herein is an infill-based overlay system, comprising: a layer of geotextile fabric partially or substantially adhered to a substrate; a first adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; a second layer of a resurfacer; a first layer of a color; a second layer of a color; and playing lines.

Disclosed herein is an infill-based overlay system, comprising: a layer of geotextile fabric partially or substantially adhered to a substrate; a first adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; a second layer of a resurfacer; a first layer of a color; a second layer of a color; a third layer of color; and playing lines. Disclosed herein is an infill-based overlay system, comprising: a layer of seaming material; a layer of geotextile fabric partially or substantially adhered to a substrate; a first adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; a second layer of a resurfacer; a first layer of a color; a second layer of a color; a third layer of color; and playing lines. Disclosed herein is an infill-based overlay system, comprising: a layer of geotextile fabric; a first adhesive layer; a first infill layer; a second adhesive layer; and a second infill layer. Disclosed herein is an infill-based overlay system, comprising: a layer of seaming material; a layer of geotextile fabric; a first adhesive layer; a first infill layer; a second adhesive layer; and a second infill layer. Disclosed herein is an infill-based overlay system, comprising: a layer of geotextile fabric partially or substantially adhered to a substrate; a first adhesive layer adhered to the layer of geotextile fabric; a first infill layer; a second adhesive layer adhered to the first infill layer; and a second infill layer.

Disclosed herein is an infill-based overlay system, comprising: a layer of geotextile fabric partially or substantially adhered to a substrate; a first adhesive layer adhered to the layer of geotextile fabric; a first infill layer comprising sand, rubber, or a rubber alternative, or a combination thereof adhered to the first adhesive layer; a second adhesive layer adhered to the first infill layer; and a second infill layer comprising sand, rubber, or a rubber alternative, or a combination thereof adhered to the second adhesive layer. Disclosed herein is an infill-based overlay system, comprising: a layer of geotextile fabric partially or substantially adhered to a substrate; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; and at least one layer of a resurfacer. Disclosed herein is an infill-based overlay system, comprising: a layer of geotextile fabric partially or substantially adhered to a substrate; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; and at least one layer of a color. Disclosed herein is an infill-based overlay system, comprising: a layer of geotextile fabric partially or substantially adhered to a substrate; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; a first layer of a color; and a second layer of a color. Disclosed herein is an infill-based overlay system, comprising: a layer of geotextile fabric partially or substantially adhered to a substrate; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; a first layer of a color; a second layer of a color; and playing lines. Disclosed herein is an infill-based overlay system, comprising: a layer of geotextile fabric partially or substantially adhered to a substrate; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; a first layer of a color; a second layer of a color; a third layer of a color; and playing lines. Disclosed herein is an infill-based overlay system, comprising: a layer of seaming material; a layer of geotextile fabric partially or substantially adhered to a substrate; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; a first layer of a color; a second layer of a color; a third layer of a color; and playing lines. Disclosed herein is an infill-based overlay system, comprising: a layer of geotextile fabric partially or substantially adhered to a substrate; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer applied to the second infill layer; and a third infill layer comprising sand, rubber, or a combination of sand and rubber adhered to the third adhesive layer. Disclosed herein is an infill-based overlay system, comprising: a layer of seaming material; a layer of geotextile fabric partially or substantially adhered to a substrate; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer applied to the second infill layer; and a third infill layer comprising sand, rubber, or a rubber alternative, or a combination thereof adhered to the third adhesive layer.

Disclosed herein is an infill-based overlay system, comprising: a layer of geotextile fabric partially or substantially adhered to a substrate; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer applied to the second infill layer; a third infill layer comprising sand, rubber, or a rubber alternative, or a combination thereof adhered to the third adhesive layer. Disclosed herein is an infill-based overlay system, comprising: a layer of geotextile fabric partially or substantially adhered to a substrate; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer applied to the second infill layer; a third infill layer comprising sand, rubber, or a rubber alternative, or a combination thereof adhered to the third adhesive layer; a fourth adhesive layer adhered to the third infill layer; a first layer of a resurfacer; and a second layer of a resurfacer. Disclosed herein is an infill-based overlay system, comprising: a layer of geotextile fabric partially or substantially adhered to a substrate; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer sand, rubber, or a rubber alternative, or a combination thereof adhered to the third adhesive layer; a fourth adhesive layer adhered to the third infill layer; a first layer of a resurfacer; a second layer of a resurfacer; and at least one layer of color. Disclosed herein is an infill-based overlay system, comprising: a layer of geotextile fabric partially or substantially adhered to a substrate; a first adhesive layer applied to the layer of geotextile fabric; a first infill layer sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer comprising sand, rubber, or a rubber alternative, or a combination thereof adhered to the third adhesive layer; a fourth adhesive layer adhered to the third infill layer; a first layer of a resurfacer; a second layer of a resurfacer; a first layer of color; and a second layer of color. Disclosed herein is an infill-based overlay system, comprising: a layer of geotextile fabric partially or substantially adhered to a substrate; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer comprising sand, rubber, or a rubber alternative, or a combination thereof; a fourth adhesive layer adhered to the third infill layer; a first layer of a resurfacer; a second layer of a resurfacer; a first layer of color; a second layer of color; and playing lines.

Disclosed herein is an infill-based overlay system, comprising: a layer of geotextile fabric partially or substantially adhered to a substrate; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer comprising sand, rubber, or a rubber alternative, or a combination thereof adhered to the third adhesive layer; a fourth adhesive layer adhered to the third infill layer; a first layer of a resurfacer; a second layer of a resurfacer; a first layer of color; a second layer of color; a third layer of color; and playing lines. Disclosed herein is an infill-based overlay system, comprising: a layer of seaming material; a layer of geotextile fabric partially or substantially adhered to a substrate; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer comprising sand, rubber, or a rubber alternative, or a combination thereof adhered to the third adhesive layer; a fourth adhesive layer adhered to the third infill layer; a first layer of a resurfacer; a second layer of a resurfacer; a first layer of color; a second layer of color; a third layer of color; and playing lines. Disclosed herein is an infill-based overlay system, comprising: a layer of seaming material; a layer of geotextile fabric partially or substantially adhered to a substrate; a first adhesive layer applied to the layer of geotextile fabric; a first infill layer comprising rubber or a rubber alternative, or a combination of sand and rubber or a rubber alternative adhered to the first adhesive layer; a second adhesive layer applied to the first infill layer; a second infill layer comprising sand adhered to the second adhesive layer; a third adhesive layer adhered to the second infill layer; a first layer of a resurfacer; a second layer of a resurfacer; a first layer of a color; a second layer of color; and playing lines. Disclosed herein is an infill-based overlay system, comprising: a layer of seaming material; a layer of geotextile fabric partially or substantially adhered to a substrate; a first adhesive layer applied to the layer of geotextile fabric; a first infill layer comprising rubber or a rubber alternative or a combination of sand and rubber or a rubber alternative, or a combination thereof adhered to the first adhesive layer; a second adhesive layer applied to the first infill layer; a second infill layer comprising sand adhered to the second adhesive layer; a third adhesive layer adhered to the second infill layer; a third infill layer comprising sand adhered to the third adhesive layer; a fourth adhesive layer adhered to the third infill layer; a first layer of a resurfacer; a second layer of a resurfacer; a first layer of a color; a second layer of color; and playing lines.

Disclosed herein a method of installing an infill-based overlay system, comprising: contacting a layer of geotextile fabric to the surface of a substrate; applying an adhesive to a surface of the geotextile fabric; and adding an infill layer to the adhesive layer. Disclosed herein a method of installing an infill-based overlay system, comprising: contacting a layer of geotextile fabric to the surface of a substrate; applying one or more layers of adhesives; and adding one or more infill layers. Disclosed herein a method of installing an infill-based overlay system, comprising: contacting a layer of geotextile fabric to the surface of a substrate; applying an adhesive to a surface of the geotextile fabric; and adding an infill layer comprising sand, rubber, or a rubber alternative, or a combination thereof to the adhesive layer. Disclosed herein a method of installing an infill-based overlay system, comprising: contacting a layer of geotextile fabric to the surface of a substrate; applying one or more layers of adhesives; and adding one or more infill layers comprising sand, rubber, or a rubber alternative, or a combination thereof. Disclosed herein a method of installing an infill-based overlay system, comprising: correcting one or more deformations in the existing substrate; contacting a layer of geotextile fabric to the surface of a substrate; applying an adhesive to a surface of the geotextile fabric; adding an infill layer to the adhesive layer. Disclosed herein a method of installing an infill-based overlay system, comprising: correcting one or more deformations in the existing substrate; contacting a layer of geotextile fabric to the surface of a substrate; applying an adhesive to a surface of the geotextile fabric; adding an infill layer comprising sand, rubber, or a rubber alternative, or a combination thereof to the adhesive layer. Disclosed herein a method of installing an infill-based overlay system, comprising: correcting one or more deformations in the existing substrate; contacting a layer of geotextile fabric to the surface of a substrate; applying one or more layers of adhesives; and adding one or more infill layers comprising sand, rubber, or a rubber alternative, or a combination thereof. Disclosed herein a method of installing an infill-based overlay system, comprising: correcting one or more deformations in the existing substrate; contacting a layer of geotextile fabric to the surface of a substrate; applying one or more layers of adhesives; and adding one or more infill layers comprising sand, rubber, or a rubber alternative, or a combination thereof. Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof adhered to the first adhesive layer; applying a second adhesive to the infill layer; applying at least one layer of a resurfacer; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof, to the first adhesive layer; applying a second adhesive to the infill layer; applying a first layer of a resurfacer; applying a second layer of a resurfacer; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof to the first adhesive layer; applying a second adhesive to the infill layer; applying a first layer of a resurfacer; applying a second layer of a resurfacer; applying at least one layer of color; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof to the first adhesive layer; applying a second adhesive to the infill layer; applying a first layer of a resurfacer; applying a second layer of resurfacer; applying a first layer of color; applying a second layer of color; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof to the first adhesive layer; applying a second adhesive to the infill layer; applying a first layer of a resurfacer; applying a second layer of resurfacer; applying a first layer of color; applying a second layer of color; applying a third layer of color; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying at least one layer of a resurfacer; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying a first layer of a resurfacer; applying a second layer of a resurfacer; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying a first layer of a resurfacer; applying a second layer of a resurfacer; applying at least one layer of color; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying a first layer of a resurfacer; applying a second layer of a resurfacer; applying a first layer of color; applying a second layer of color; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying a first layer of a resurfacer; applying a second layer of a resurfacer; applying a first layer of color; applying a second layer of color; applying a third layer of color; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying at least one layer of a resurfacer; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying a first layer of a resurfacer; applying a second layer of a resurfacer; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying a first layer of a resurfacer; applying a second layer of a resurfacer; applying at least one layer of color; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying a first layer of a resurfacer; applying a second layer of a resurfacer; applying a first layer of color; applying a second layer of color; and providing playing lines on the surface of the overlay. Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying a first layer of a resurfacer; applying a second layer of a resurfacer; applying a first layer of color; applying a second layer of color; applying a third layer of color; and providing playing lines on the surface of the overlay. Disclosed herein a method of installing an infill-based overlay system, comprising: correcting one or more deformations in the substrate; contacting the substrate with two or more pieces of geotextile fabric; inserting a seaming material under the edges of two adjacent pieces of geotextile fabric; applying a first adhesive layer to the top surface of the seaming material; contacting the two adjacent pieces of geotextile fabric with the adhesive on the top surface of the seaming material; applying pressure to the seam of the two adjacent pieces of geotextile fabric to create a layer of seamed geotextile fabric; applying a second adhesive layer to the surface of the layer of seamed geotextile fabric; adding an infill layer comprising sand, rubber, or a rubber alternative, or a combination thereof to the second adhesive layer; applying a third adhesive layer to the surface of the infill layer; applying at least one layer of a resurfacer; applying at least one layer of color; and providing playing lines on the surface of the overlay. Disclosed herein a method of installing an infill-based overlay system, comprising: correcting one or more deformations in the substrate; contacting the substrate with two or more pieces of geotextile fabric; inserting a seaming material under the edges of two adjacent pieces of geotextile fabric; applying a first adhesive layer to the top surface of the seaming material; contacting the two adjacent pieces of geotextile fabric with the adhesive on the top surface of the seaming material; applying pressure to the seam of the two adjacent pieces of geotextile fabric to create a layer of seamed geotextile fabric; applying a second adhesive layer to the surface of the layer of seamed geotextile fabric; adding a first infill layer comprising sand, rubber, or a rubber alternative, or a combination thereof to the second adhesive layer; applying a third adhesive layer to the surface of the first infill layer; adding a second infill layer comprising sand, rubber, or a rubber alternative, or a combination thereof to the second adhesive layer; applying a fourth adhesive layer to the surface of the second infill layer; applying at least one layer of a resurfacer; applying at least one layer of color; and providing playing lines on the surface of the overlay. Disclosed herein a method of installing an infill-based overlay system, comprising: correcting one or more deformations in the substrate; contacting the substrate with two or more pieces of geotextile fabric; inserting a seaming material under the edges of two adjacent pieces of geotextile fabric; applying a first adhesive layer to the top surface of the seaming material; contacting the two adjacent pieces of geotextile fabric with the adhesive on the top surface of the seaming material; applying pressure to the seam of the two adjacent pieces of geotextile fabric to create a layer of seamed geotextile fabric; applying a second adhesive layer to the surface of the layer of seamed geotextile fabric; adding a first infill layer comprising sand, rubber, or a rubber alternative, or a combination thereof to the second adhesive layer; applying a third adhesive layer to the surface of the first infill layer; adding a second infill layer comprising sand, rubber, or a rubber alternative, or a combination thereof to the second adhesive layer; applying a fourth adhesive layer to the surface of the second infill layer; adding a third infill layer comprising sand, rubber, or a rubber alternative, or a combination thereof to the second adhesive layer; applying a fifth adhesive layer to the surface of the third infill layer; applying at least one layer of a resurfacer; applying at least one layer of color; and providing playing lines on the surface of the overlay.

DETAILED DESCRIPTION

Figure 1:
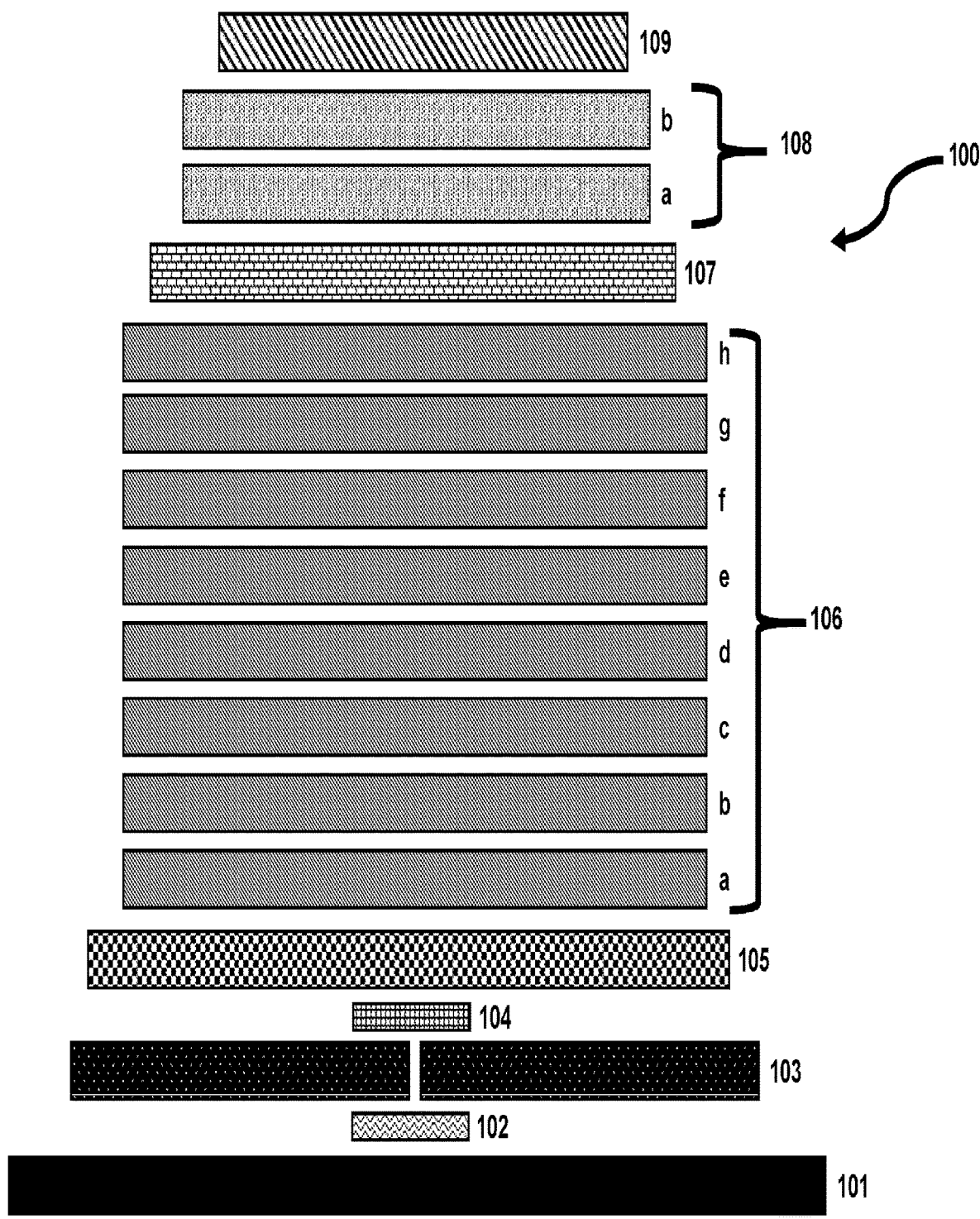
FIG. 1 shows a cross-sectional schematic of a disclosed installed binder-based overlay system (100), comprising (101) a substrate, (102) a seaming material adhered to the underside of (103) the layer of geotextile fabric, (104) a fiberglass mesh over the seam, (105) a primer layer adhered to the top layer of geotextile fabric, (106) one or more binder layers (e.g., (106)(*a*)-106(*h*)), (107) a resurfacer layer, (108) two color layers (e.g., (108)(*a*)-108(*b*)), and (109) playing lines.

The present invention can be understood more readily by reference to the following detailed description of the invention.

Before the present systems and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention.

Definitions

As used in the specification and the appended claims, the singular forms "a", "an", and "the" include plural referents unless the context clearly dictates otherwise.

The phrase "consisting essentially of" limits the scope of a claim to the recited components in a composition or the recited steps in a method as well as those that do not materially affect the basic and novel characteristic or characteristics of the claimed composition or claimed method. The phrase "consisting of" excludes any component, step, or element that is not recited in the claim. The phrase "comprising" is synonymous with "including", "containing", or "characterized by", and is inclusive or open-ended. "Comprising" does not exclude additional, unrecited components or steps.

As used herein, when referring to any numerical value, the term "about" means a value falling within a range that is ±10% of the stated value.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight component X and 5 parts by weight component Y, X and Y are present at a weight ratio of 2:5, and are present in such ratio regardless of whether additional components are contained in the compound.

As used herein, the terms "optional" or "optionally" means that the subsequently described event or circumstance can or cannot occur, and that the description includes instances where said event or circumstance occurs and instances where it does not. In an aspect, a disclosed method can optionally comprise one or more additional steps, such as, for example, repeating an administering step or altering an administering step.

As used herein, the term "prevent" or "preventing" refers to precluding, averting, obviating, forestalling, stopping, or hindering something from happening, especially by advance action. It is understood that where reduce, inhibit, or prevent are used herein, unless specifically indicated otherwise, the use of the other two words is also expressly disclosed. In an aspect, the disclosed overlay systems prevent the formation of cracks and other deformations in an athletic court (e.g., a basketball court, a volleyball court, a racquet ball court, a tennis court, a track, etc.) or some other playing surface.

As used herein, "modifying the method" can comprise modifying or changing one or more features or aspects of one or more steps of a disclosed method. For example, in an aspect, a disclosed method can be altered by changing the number of infill layers or the type of infill layers installed in a disclosed overlay system. For example, in an aspect, a disclosed method can be altered by changing the number of binder layers or the type off binder layers installed in a disclosed overlay system. In an aspect, modifying a method can be used to customize the overlay to an existing substrate or climate, especially modifying the content or number of binder layers or infill layers.

The term "contacting" or "applying" as used herein refers to bringing a component together with a target area or intended target area in such a manner that the component can exert an effect on the intended target or targeted area either directly or indirectly. A target or intended target area can be a substrate, a layer or geotextile fabric, a binder layer, an infill layer, a seaming material, an adhesive layer, a resurfacer layer, a color layer, or a combination thereof.

The term "mixing" as used in a disclosed method means to physically combine the recited components so as to achieve a homogenous formulation or solution. In an aspect, the recited components can be shaken, or stirred, or agitated so as to achieve a homogenous formulation or solution. In an aspect, "mixing" can also include sifting the homogenous formulation or solution though a fine mesh strainer. The mixing can be generally performed for a pre-determined amount of time, i.e., for 10 seconds, 20 seconds, 30 seconds, 45 seconds, 1 minute, 5 minute, 10 minutes, 20 minutes, 30 minutes, 40 minutes, 50 minutes, 1 hour, 2 hours, 3 hours, or more. A person skilled in the art could ascertain without undue experimentation, the amount of time required to mix the recited components so as to achieve a homogenous formulation or solution. In an aspect, "mixing" can be occur prior to or at the time of installation. For example, a binder can be mixed with sand, rubber, or a rubber alternative, or a combination thereof at the time of adding the binder layer to the primer The term "drying" means the process of allowing the applied or added layer to remain undisturbed for a period of time so as to no longer be wet or moist.

As used herein, "effective amount" and "amount effective" can refer to an amount that is sufficient to achieve the desired result such as, for example, adhering a layer of the overlay to another layer or adhering a layer of the overlay to the substrate.

Disclosed are the components to be used to prepare a disclosed overlay system as well as the components used within the methods disclosed herein. These and other materials are disclosed herein, and it is understood that when combinations, subsets, interactions, groups, etc. of these materials are disclosed that while specific reference of each various individual and collective combinations and permutation of these systems cannot be explicitly disclosed, each is specifically contemplated and described herein. For example, if a particular system is disclosed and discussed and a number of modifications that can be made to that system are discussed, specifically contemplated is each and every combination and permutation of the compound and the modifications that are possible unless specifically indicated to the contrary. This concept applies to all aspects of this application including, but not limited to, steps in methods of making and installing the disclosed overlay systems. Thus, if there are a variety of additional steps that can be performed it is understood that each of these additional steps can be performed with any specific embodiment or combination of embodiments of the methods of the invention.

Compositions

Disclosed herein are binder-based and infill-based overlay systems.

Overlay Systems (Binder-Based)

Disclosed herein are binder-based overlay systems. Disclosed herein are binder-based overlay systems that can be used indoors or outdoors. In an aspect, a disclosed binder-based overlay system can be used to provide a variety of athletic playing surfaces. For example, in an aspect, an binder-based overlay system can be used to provide an indoor or an outdoor tennis court, a pickle ball court, a basketball court, a track (e.g., an oblong running track), a racquet ball court, a volleyball court, or a badminton court.

Disclosed herein is an overlay system comprising a layer of seaming material; a layer of geotextile fabric; a primer layer adhered to the layer of geotextile fabric; one or more binder layers comprising sand, rubber, or a rubber alternative, or a combination thereof adhered to the primer layer; a resurfacer layer; a first color layer; a second color layer; and playing lines.

Disclosed herein is an overlay system comprising a layer of seaming material; a layer of geotextile fabric; a primer layer adhered to the layer of geotextile fabric; one or more binder layers comprising sand, rubber, or a rubber alternative, or a combination thereof adhered to the primer layer; a first resurfacer layer; a second resurfacer layer; a first color layer; a second color layer; and playing lines.

Disclosed herein is an overlay system comprising a layer of geotextile fabric; a primer layer adhered to the layer of geotextile fabric; one or more binder layers comprising sand, rubber, or a rubber alternative, or a combination thereof adhered to the primer layer; a resurfacer layer; a first color layer; a second color layer; and playing lines.

Disclosed herein is an overlay system comprising a layer of seaming material; a layer of geotextile fabric; a primer layer adhered to the layer of geotextile fabric; one or more binder layers comprising sand, rubber, or a rubber alternative, or a combination thereof adhered to the primer layer; a resurfacer layer; a first color layer; a second color layer; and playing lines. For example, FIG. 1 shows a cross-sectional schematic of a disclosed installed primer-based overlay system. In FIG. 1, the overlay system (100) comprises (101) a substrate, (102) a seaming material adhered to the underside of (103) the layer of geotextile fabric, (104) a fiberglass mesh over the seam, (105) a primer layer adhered to the top layer of geotextile fabric, (106) one or more binder layers (e.g., 106(a)-106(h)), (107) a resurfacer layer, (108) two color layers (e.g., 108(a)-108(b)), and (109) playing lines.

Disclosed herein is an overlay system comprising a layer of seaming material; a layer of geotextile fabric; a primer layer; one or more binder layers; a first resurfacer layer; a second resurfacer layer; a first color layer; a second color layer; and playing lines.

Figure 2:
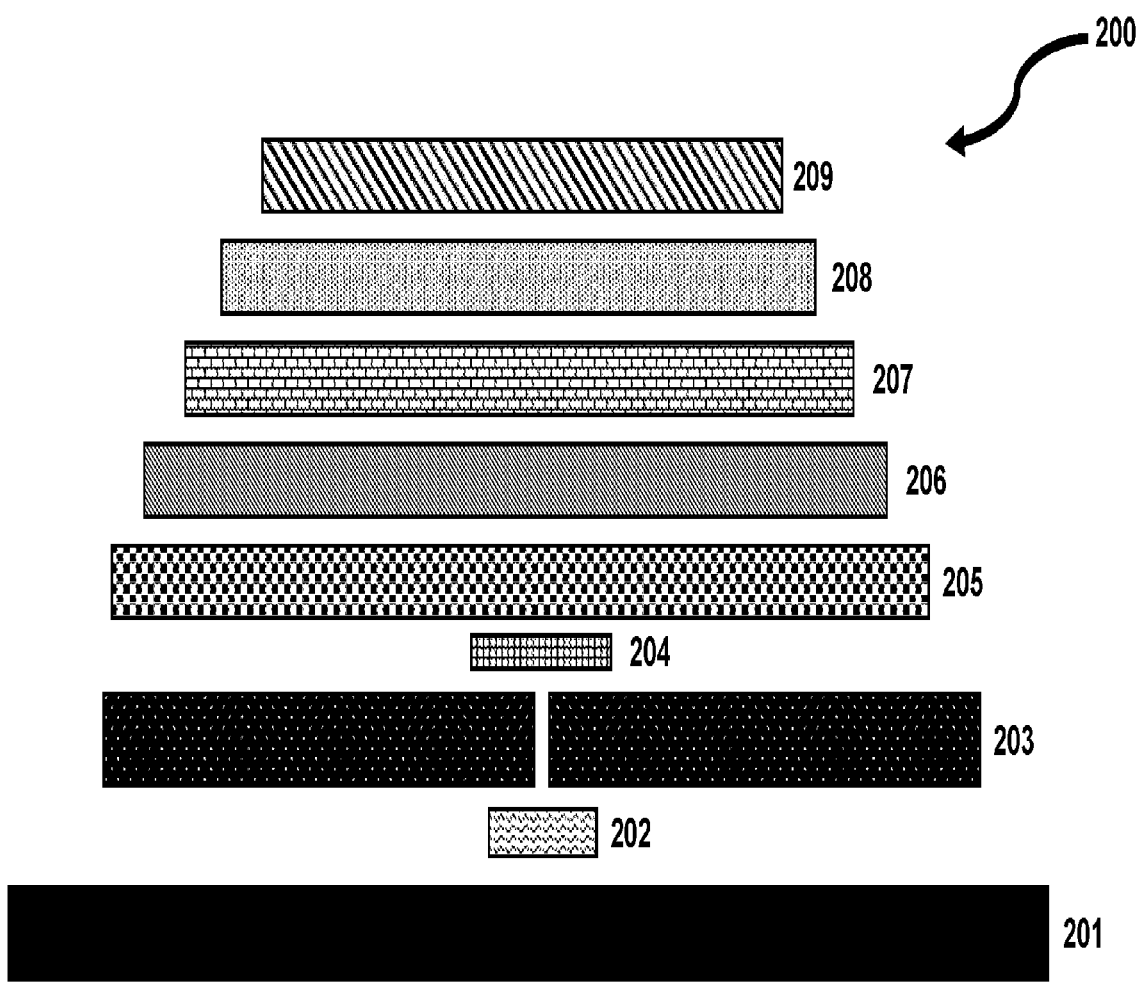
FIG. 2 shows a cross-sectional schematic of a disclosed installed infill-based overlay system (200), comprising (201) a substrate, (202) a seaming material adhered to (203) the layer of geotextile fabric, (204) a fiberglass mesh over the seam, (205) a primer layer, (206) one or more binder layers, (207) one or more resurfacer layers, (208) one or more color layers, and (209) playing lines.

Disclosed herein is an overlay system comprising a layer of geotextile fabric; a primer layer; one or more binder layers; one or more resurfacer layers; one or more color layers; and playing lines. For example, FIG. 2 shows a cross-sectional schematic of an installed disclosed infill-based overlay system (200). In FIG. 2, the overlay system (200) comprises (201) a substrate, (202) a seaming material adhered to (203) the layer of geotextile fabric, (204) a fiberglass mesh over the seam, (205) a primer layer, (206) one or more binder layers, (207) one or more resurfacer layers, (208) one or more color layers, and (209) playing lines. FIG. 2 shows fiberglass mesh over the seam in (204), which can be optionally added.

Disclosed herein is an overlay system comprising a layer of seaming material; layer of geotextile fabric; a primer layer; between 1-8 binder layers; two or more resurfacer layers; two or more color layers; and playing lines.

Disclosed herein is an overlay system comprising a layer of geotextile fabric; a primer layer; and one or more binder layers. Disclosed herein an overlay system comprising: a layer of seaming material; a layer of geotextile fabric; a primer layer; and one or more binder layers.

Disclosed herein an overlay system comprising a layer of geotextile fabric; a primer layer; and two or more binder layers. Disclosed herein is an overlay system comprising a layer of seaming material; a layer of geotextile fabric; a primer layer; and two or more binder layers.

Disclosed herein is an overlay system comprising a layer of seaming material; a layer of geotextile fabric; two or more primer layers; and two or more binder layers. Disclosed herein is an overlay system comprising a layer of geotextile fabric; two or more primer layers; and two or more binder layers.

Disclosed herein is an overlay system comprising a layer of geotextile fabric; a primer layer adhered to the layer of geotextile fabric; and one or more binder layers adhered to the primer layer. Disclosed herein is an overlay system comprising a layer of seaming material; a layer of geotextile fabric; a primer layer adhered to the layer of geotextile fabric; and one or more binder layers adhered to the primer layer.

Disclosed herein is an overlay system comprising a layer of geotextile fabric; a primer layer adhered to the layer of geotextile fabric; and two or more binder layers adhered to the primer layer. Disclosed herein is an overlay system, comprising a layer of seaming material; a layer of geotextile; a primer layer adhered to the layer of geotextile fabric; and two or more binder layers adhered to the primer layer.

Disclosed herein is an overlay system comprising a layer of seaming material; a layer of geotextile fabric; two or more primer layers adhered to the layer of geotextile fabric; and two or more binder layers adhered to the two or more primer layers.

Disclosed herein is an overlay system comprising a layer of geotextile fabric; two or more primer layers adhered to the layer of geotextile fabric; and two or more binder layers adhered to the two or more primer layers.

Overlay Systems (Infill-Based)

Disclosed herein are infill-based overlay systems. Disclosed herein are infill-based overlay systems that can be used indoors or outdoors. In an aspect, a disclosed infill-based overlay system can be used to provide a variety of athletic playing surfaces. For example, in an aspect, an infill-based overlay system can be used to provide an indoor or an outdoor tennis court, a pickle ball court, a basketball court, a track (e.g., an oblong running track), a racquet ball court, a volleyball court, or a badminton court.

1. Infill Layer

Disclosed herein is an overlay system, comprising: a layer of geotextile fabric; an adhesive layer; and an infill layer. Disclosed herein is an overlay system, comprising: a layer of seaming material; a layer of geotextile fabric; an adhesive layer; and an infill layer. Disclosed herein is an overlay system, comprising: at least one layer of geotextile fabric; at least one adhesive layer; and at least one infill layer.

Disclosed herein is an overlay system, comprising: a layer of geotextile fabric; an adhesive layer applied to the layer of geotextile fabric; and an infill layer. Disclosed herein is an overlay system, comprising: a layer of geotextile fabric; an adhesive layer applied to the layer of geotextile fabric; and an infill layer comprising sand, rubber, or a rubber alternative, or a combination thereof adhered to the adhesive layer. Disclosed herein is an overlay system, comprising: a layer of seaming material; a layer of geotextile fabric; an adhesive layer applied to the layer of geotextile fabric; and an infill layer comprising sand, rubber, or a rubber alternative, or a combination thereof adhered to the adhesive layer. Disclosed herein is an overlay system, comprising: a layer of geotextile fabric; a first adhesive layer applied to the layer of geotextile fabric; an infill layer comprising sand, rubber, or a rubber alternative, or a combination thereof adhered to the adhesive layer; a second adhesive layer applied to the infill layer; and at least one layer of a resurfacer.

Disclosed herein is an overlay system, comprising: a layer of geotextile fabric; a first adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; and a second layer of a resurfacer.

Disclosed herein is an overlay system, comprising: a layer of geotextile fabric; a first adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; a second layer of a resurfacer; and at least one layer of a color.

Disclosed herein is an overlay system, comprising: a layer of geotextile fabric; an adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; a second layer of a resurfacer; a first layer of a color; and a second layer of a color.

Disclosed herein is an overlay system, comprising: a layer of geotextile fabric partially or substantially adhered to a substrate; a first adhesive layer applied to the layer of geotextile fabric; an infill layer comprising sand, rubber, or a rubber alternative, or a combination thereof adhered to the adhesive layer; a second adhesive layer applied to the infill layer; a first layer of a resurfacer; a second layer of a resurfacer; a first layer of a color; a second layer of a color; and playing lines. For example, FIG. 1 shows a cross-sectional schematic of an installed disclosed overlay system.

Disclosed herein is an overlay system, comprising: a layer of geotextile fabric; a first adhesive layer applied to the layer of geotextile fabric; an infill layer comprising sand, rubber, or a combination of sand and rubber adhered to the adhesive layer; a second adhesive layer applied to the infill layer; a first layer of a resurfacer; a second layer of a resurfacer; a first layer of a color; a second layer of a color; a third layer of color; and playing lines.

Disclosed herein is an overlay system, comprising: a layer of seaming material; a layer of geotextile fabric; a first adhesive layer applied to the layer of geotextile fabric; an infill layer comprising sand, rubber, or a combination of sand and rubber adhered to the adhesive layer; a second adhesive layer applied to the infill layer; a first layer of a resurfacer; a second layer of a resurfacer; a first layer of a color; a second layer of a color; a third layer of color; and playing lines.

In an aspect of a disclosed overlay having at least 1 infill layer or one or more infill layers, the layer of geotextile fabric can be partially adhered or substantially adhered to a substrate, or in an aspect, the layer of geotextile fabric can be positioned but not adhered over a substrate.

2. Infill Layers

Disclosed herein is an overlay system, comprising: at least one layer of geotextile fabric; at least one adhesive layer; and at least two infill layers. Disclosed herein is an overlay system, comprising: a layer of geotextile fabric; three adhesive layers; and two infill layers. Disclosed herein is an overlay system, comprising: a layer of geotextile fabric; a first adhesive layer; a first infill layer; a second adhesive layer; and a second infill layer. Disclosed herein is an overlay system, comprising: a layer of seaming material; a layer of geotextile fabric; a first adhesive layer; a first infill layer; a second adhesive layer; and a second infill layer.

Disclosed herein is an overlay system, comprising: a layer of geotextile fabric; a first adhesive layer adhered to the layer of geotextile fabric; a first infill layer; a second adhesive layer adhered to the first infill layer; and a second infill layer. Disclosed herein is an overlay system, comprising: a layer of geotextile fabric; a first adhesive layer adhered to the layer of geotextile fabric; a first infill layer comprising sand, rubber, or a rubber alternative, or a combination thereof adhered to the first adhesive layer; a second adhesive layer adhered to the first infill layer; and a second infill layer comprising sand, rubber, or a rubber alternative, or a combination thereof adhered to the second adhesive layer.

Disclosed herein is an overlay system, comprising: a layer of geotextile fabric; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; and at least one layer of a resurfacer.

Disclosed herein is an overlay system, comprising: a layer of geotextile fabric; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; and at least one layer of a color.

Disclosed herein is an overlay system, comprising: a layer of geotextile fabric; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising or a rubber alternative, or a combination thereof adhered to the second adhesive layer; a third adhesive layer adhered to the second infill layer; a first layer of a resurfacer; a second layer of a resurfacer; a first layer of a color; and a second layer of a color.

Disclosed herein is an overlay system, comprising: a layer of geotextile fabric; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; a first layer of a color; a second layer of a color; and playing lines.

Disclosed herein is an overlay system, comprising: a layer of geotextile fabric; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; a first layer of a color; a second layer of a color; a third layer of a color; and playing lines.

Disclosed herein is an overlay system, comprising: a layer of seaming material; a layer of geotextile fabric; a first adhesive layer adhered to the layer of geotextile fabric; a first infill layer comprising sand, rubber, or a rubber alternative, or a combination thereof adhered to the first adhesive layer; a second adhesive layer adhered to the first infill layer; a second infill layer comprising sand, rubber, or a rubber alternative, or a combination thereof adhered to the second adhesive layer; a third adhesive layer adhered to the second infill layer; a first layer of a resurfacer; a second layer of a resurfacer; a first layer of a color; a second layer of a color; a third layer of a color; and playing lines.

Disclosed herein is an overlay system, comprising: a layer of seaming material; a layer of geotextile; a first adhesive layer applied to the layer of geotextile fabric; a first infill layer comprising rubber or a combination of sand and rubber adhered to the first adhesive layer; a second adhesive layer applied to the first infill layer; a second infill layer comprising sand adhered to the second adhesive layer; a third adhesive layer adhered to the second infill layer; a first layer of a resurfacer; a second layer of a resurfacer; a first layer of a color; a second layer of color; and playing lines.

In an aspect of a disclosed overlay having at least 2 infill layers or 2 or more infill layers, the layer of geotextile fabric can be partially adhered or substantially adhered to a substrate, or in an aspect, the layer of geotextile fabric can be positioned but not adhered over a substrate.

3. Infill Layers

Disclosed herein is an overlay system, comprising: a layer of geotextile fabric; four adhesive layers; and three infill layers. Disclosed herein is an overlay system, comprising: a layer of geotextile fabric; a first adhesive layer; a first infill layer; a second adhesive layer; a second infill layer, a third adhesive layer, and a third infill layer.

Disclosed herein is an overlay system, comprising: a layer of geotextile fabric; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof to the second adhesive layer; a third adhesive layer applied to the second infill layer; and a third infill layer comprising sand, rubber, or a combination of sand and rubber adhered to the third adhesive layer.

Disclosed herein is an overlay system, comprising: a layer of seaming material; a layer of geotextile fabric; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer applied to the second infill layer; and a third infill layer comprising sand, rubber, or a rubber alternative, or a combination thereof adhered to the third adhesive layer.

Disclosed herein is an overlay system, comprising: a layer of geotextile fabric; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer applied to the second infill layer; a third infill layer comprising sand, rubber, or a rubber alternative, or a combination thereof adhered to the third adhesive layer.

Disclosed herein is an overlay system, comprising: a layer of geotextile fabric; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber or a rubber alternative, or a combination thereof adhered to the second adhesive layer; a third adhesive layer applied to the second infill layer; a third infill layer comprising sand, rubber or a rubber alternative, or a combination thereof adhered to the third adhesive layer; a fourth adhesive layer adhered to the third infill layer; a first layer of a resurfacer; and a second layer of a resurfacer.

Disclosed herein is an overlay system, comprising: a layer of geotextile fabric; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer sand, rubber, or a rubber alternative, or a combination thereof adhered to the third adhesive layer; a fourth adhesive layer adhered to the third infill layer; a first layer of a resurfacer; a second layer of a resurfacer; and at least one layer of color.

Disclosed herein is an overlay system, comprising: a layer of geotextile; a first adhesive layer applied to the layer of geotextile fabric; a first infill layer sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer comprising sand, rubber, or a rubber alternative, or a combination thereof adhered to the third adhesive layer; a fourth adhesive layer adhered to the third infill layer; a first layer of a resurfacer; a second layer of a resurfacer; a first layer of color; and a second layer of color.

Disclosed herein is an overlay system, comprising: a layer of geotextile fabric; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer comprising sand, rubber, or a rubber alternative, or a combination thereof; a fourth adhesive layer adhered to the third infill layer; a first layer of a resurfacer; a second layer of a resurfacer; a first layer of color; a second layer of color; and playing lines.

Disclosed herein is an overlay system, comprising: a layer of geotextile fabric; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer comprising sand, rubber, or a rubber alternative, or a combination thereof adhered to the third adhesive layer; a fourth adhesive layer adhered to the third infill layer; a first layer of a resurfacer; a second layer of a resurfacer; a first layer of color; a second layer of color; a third layer of color; and playing lines.

Disclosed herein is an overlay system, comprising: a layer of seaming material; a layer of geotextile fabric; a first adhesive layer applied to the layer of geotextile fabric; a first infill layer comprising sand, rubber, or a rubber alternative, or a combination thereof adhered to the first adhesive layer; a second adhesive layer applied to the first infill layer; a second infill layer comprising sand, rubber, or a rubber alternative, or a combination thereof adhered to the second adhesive layer; a third adhesive layer adhered to the second infill layer; a third infill layer comprising sand, rubber, or a rubber alternative, or a combination thereof adhered to the third adhesive layer; a fourth adhesive layer adhered to the third infill layer; a first layer of a resurfacer; a second layer of a resurfacer; a first layer of color; a second layer of color; a third layer of color; and playing lines.

Disclosed herein is an overlay system, comprising: a layer of seaming material; a layer of geotextile fabric; a first adhesive layer applied to the layer of geotextile fabric; a first infill layer comprising rubber or a combination of sand and rubber adhered to the first adhesive layer; a second adhesive layer applied to the first infill layer; a second infill layer comprising sand adhered to the second adhesive layer; a third adhesive layer adhered to the second infill layer; a third infill layer comprising sand adhered to the third adhesive layer; a fourth adhesive layer adhered to the third infill layer; a first layer of a resurfacer; a second layer of a resurfacer; a first layer of a color; a second layer of color; and playing lines. In an aspect of a disclosed overlay having at least 3 infill layers or 3 or more infill layers, the layer of geotextile fabric can be partially adhered or substantially adhered to a substrate, or in an aspect, the layer of geotextile fabric can be positioned but not adhered over a substrate.

Components of the Disclosed Overlay Systems

Seaming Materials

In an aspect, one or more pieces of geotextile fabric can be seamed together to create a layer of geotextile fabric. In an aspect, the pieces of geotextile fabric can be seamed together by one or more seaming materials. In an aspect, the seaming material can be applied to underside of the layer of geotextile fabric. For example, the seaming material can be applied to the surface of the geotextile fabric that directly contacts the substrate. In an aspect, seaming material can be used wherever two separate pieces of geotextile fabric abut one another. In an aspect, the seaming material can overlap with each piece of geotextile fabric by about 3 inches to about 12 inches, or about 6 inches to about 9 inches, or about 7 inches to about 8 inches. Thus, if the seaming material overlaps with each piece of geotextile fabric by about 3 inches, then the width of the seaming material is about 6 inches. Similarly, if the seaming material overlaps with each piece of geotextile fabric by about 6 inches, then the width of the seaming material is about 12 inches. In an aspect, seaming material can be used wherever two separate pieces of geotextile fabric abut one another. In an aspect, the seaming material can overlap with each piece of geotextile fabric by at least 3 inches, by at least 6 inches, by at least 9 inches, or by about 12 inches.

Seaming materials are known to the art and are commercially available. Commercially available seaming materials can include, but are not limited to, woven and non-woven geotextile fabrics, carpet seaming tapes, Mylar®, and Tyvek. Mylar® is Dupont's registered trademark for a specific family of products made from the resin polyethylene terephthalate (PET). Mylar products commonly refer to polyester films or plastic films, which can be manufactured in a variety of different combinations of types, finishes, and thicknesses. In an aspect, seaming material can be a self-adhered flashing such as Blueskin® Butyl Flash, which comprises a synthetic butyl compound, which is integrally laminated to a white engineered polypropylene film surface. In an aspect, a self-adhered flashing can be specifically designed to be self-adhered to a substrate. If a seaming material is self-adhering, then it is not necessary to use apply an adhesive to the seaming material prior to its contact with the layer of geotextile fabric.

Alternatively, in an aspect, one or more pieces of geotextile fabric can be stitched together to create a seam. For example, in an aspect, the pieces of geotextile fabric can be stitched together using thread or fibers known to the art, including, but not limited to, polypropylene, polyester, fiberglass, or polyethylene threads or fibers.

In an aspect, a piece of fiberglass mesh can be applied to the top of the seam. In an aspect, the fiberglass mesh can be applied to the top of the seam prior to or during the application of the primer coat in a binder-based overlay system. In an aspect, the fiberglass mesh can be applied to the top of the seam prior to or during the application of the first adhesive layer in an infill-based overlay system. Fiberglass mesh can strengthen the seamed geotextile fabric. See, e.g., layer (104) in FIG. 1 and (204) in FIG. 2.

Substrates

In an aspect, a substrate can be a newly installed substrate or an existing substrate. In an aspect, a substrate can comprise a variety of materials including, but not limited to, concrete, asphalt, gravel, clay, wood, or tile, or a combination thereof.

In an aspect, a disclosed overlay system can be substantially or partially adhered to a substrate. In an aspect, a disclosed overlay system can be adhered to the substrate at the perimeter. For example, in an aspect, the overlay system can be adhered to the substrate by applying an adhesive to one or more edges of the layer of geotextile fabric.

In an aspect, an adhesive can be non-continuously applied to one or more edges of the layer of geotextile fabric. In an aspect, an adhesive can be continuously applied to one or more edges of the layer of geotextile fabric. In an aspect, an adhesive can be non-continuously applied to the perimeter of the layer of geotextile fabric. In an aspect, an adhesive can be continuously applied to the perimeter of the layer of geotextile fabric. See FIG. 4(B).

In an aspect, an adhesive can be non-continuously applied to a pre-determined length of the perimeter of the layer of geotextile fabric. In other words, an adhesive can be applied to alternating pre-determined lengths of the perimeter. For example, an adhesive can be applied for to a pre-determined length of the perimeter of the layer of geotextile fabric and not applied to the immediately adjacent pre-determined length of the perimeter. Accordingly, an adhesive can be applied to the entire perimeter of the layer in an alternating "on"/"off" pattern. See FIG. 4(A).

In an aspect, the pre-determined length can be about 6" to about 24" of the perimeter, about 10" to about 20" of the perimeter, or about 12" to about 18" of the perimeter. In an aspect, the pre-determined length can be about 6", about 10", about 12", about 18", or about 24" of the perimeter. In an aspect, the pre-determined length can be about 12", about 18", or about 24". In an aspect, the pre-determined length can be about 12". In an aspect, an adhesive can be applied for a pre-determined width from one or more the edges of the layer of the geotextile fabric towards the center of the layer. In an aspect, an adhesive can be applied for a pre-determined width from the perimeter of the layer of the geotextile fabric towards the center of the layer. In an aspect, the pre-determined width can be about 3" to about 30", about 6" to about 27", about 9" to about 24", about 12" to about 21", or about 15" to about 18". In an aspect, the pre-determined width can be about 3", about 6", about 10", or about 12". In an aspect, the pre-determined width can be about 6".

Primers

In an aspect, a disclosed overlay system can comprise one or more primer layers. Primers are known to the art. For example, in an aspect, a primer can be an acrylic primer or a non-acrylic primer. Acrylic primers include styrene acrylic primers. In an aspect, a primer can comprise styrene acrylic. In an aspect, a disclosed overlay system can use a pre-fabricated primer or a primer manufactured according to a series of required or desired criteria. Pre-fabricated primers, which are commercially available, include but are not limited to, primers such as ElastoPrime™ Ultra-Maxx™, Drive-Maxx™, Climaseal™ Drive-Kote™ Black-Maxx™, and Speed Coat™ (all manufactured by Blackjack®) and Masterseal Concentrate, which is a mineral filled asphalt emulsion pavement sealer (SealMaster®). In an aspect, the primer can be Drive-Maxx™.

Geotextile Fabrics

The disclosed overlay systems can comprise various geotextile fabrics. In an aspect, a geotextile fabric can be woven or non-woven. Woven and non-woven fabrics are known to the art. Generally, woven and non-woven fabrics can perform a variety of functions, including but not limited to, drainage, separation, reinforcement, cushion, and filter. In an aspect, a geotextile fabric can be a fiberglass-reinforced geotextile.

Generally, woven geotextiles can be manufactured by weaving together narrow strips of film or threads (e.g., mono-filaments, multi-filaments or fibrillated yarns). Woven geotextiles can be referred to by tensile strength (i.e., the resistance a material has to breaking under tension). In an aspect, a woven geotextile can be relatively impermeable and can bear very high load capacity. Typically, woven geotextiles can have a uniform appearance.

Generally, non-woven geotextiles can be manufactured by using synthetic filaments or fibers that are continuously extruded and spun, blown, or placed on a moving belt and then subjected to needle punching or heat bonded (rather than weaving). Non-woven fabrics can be referred to by weight (e.g., 3.4 ounces per square yard). In an aspect, a non-woven geotextile can be used for separation, filtration, and drainage purposes.

Table 1 provides a non-exhaustive summary of some of the characteristics of both woven and non-woven geotextile fabrics.

TABLE 1

General Functions Performed by Woven and Non-Woven Geotextile Fabrics

| Woven Geotextile | Non-Woven |
| --- | --- |
| Separation | Separation |
| Reinforcement | Filtration |
| High load capacity | Drainage |
| Referred to by | Referred to by |
| Impermeable | Permeable |
| Plastic-like | Felt-like |

In an aspect, geotextile fabric can comprise a roll of pre-fabricated or manufactured geotextile fabric. As known to the art, a roll of pre-fabricated or manufactured geotextile fabric facilitates ease of installation and transport.

In an aspect, the layer of geotextile fabric comprises one or more separate pieces of geotextile fabric. In an aspect, the type of playing surface can affect the size of the one or more pieces of geotextile fabric. For example, if the playing surface is a running track (e.g., oval), then the size of the one or more pieces of geotextile fabric can be longer than that of, for example, the size of the one or more pieces of geotextile fabric for a badminton court or a tennis court.

A piece of geotextile fabric can comprise any desired width. For example, a piece of geotextile fabric can comprise a width of about 1 foot to about 30 feet. In an aspect, a piece of geotextile fabric can comprise a width of about 1 foot to about 10 feet, about 10 feet to about 20 feet, or about 20 feet to about 30 feet. In an aspect, a piece of geotextile fabric can comprise a width of about 3 feet to about 12 feet, about 12 feet to about 18 feet, or about 18 feet to about 30 feet. In an aspect, a piece of geotextile fabric can comprise a width of about 12 feet or about 18 feet.

A piece of geotextile fabric can comprise any desired length. For example, a piece of geotextile fabric can comprise a length of about 1 foot to about 500 feet. In an aspect, a piece of geotextile fabric can comprise a length of about 1 foot to about 100 feet, about 100 feet to about 200 feet, about 200 feet to about 300 feet, about 300 feet to about 400 feet, or about 400 feet to about 500 feet. In an aspect, a piece of geotextile fabric can comprise a length of about 1 foot to about 250 feet or about 250 feet to about 500 feet. In an aspect, a piece of geotextile fabric can comprise a length of about 100 feet, about 200 feet, about 300 feet, about 400 feet, or about 500 feet. In an aspect, a piece of geotextile fabric can comprise a length of about 200 feet or about 400 feet.

In an aspect, a piece of geotextile fabric can comprise a width of about 16 feet to about 18 feet and a length of about 320 feet to about 330 feet. In an aspect, a piece of geotextile fabric can be about 17 feet and 4 inches in width and about 328 feet in length.

In an aspect, the layer of geotextile fabric comprises one or more separate pieces of geotextile fabric. In an aspect, the type of playing surface can affect the size of the one or more pieces of geotextile fabric. For example, if the playing surface is a running track (e.g., oval), then the size of the one or more pieces of geotextile fabric can be longer than that of, for example, the size of the one or more pieces of geotextile fabric for a badminton court or a tennis court.

In an aspect, geotextile fabric can comprise a roll of geotextile fabric. As known to the art, a roll of material facilitates ease of installation and transport.

In an aspect of a disclosed overlay, the layer of geotextile fabric can be partially or substantially adhered to a substrate. In an aspect of a disclosed overlay, the layer of geotextile fabric can be positioned but not adhered over a substrate.

In an aspect, a disclosed overlay system can use a pre-fabricated geotextile fabric or a geotextile fabric manufactured according to a series of required or desired criteria.

Pre-Fabricated Geotextile Fabrics

Geotextile fabrics are known to the art. In an aspect, a disclosed overlay system can use a pre-fabricated, which are commercially available, geotextile fabric. For example, in an aspect, pre-fabricated geotextile fabrics include, but are not limited to, commercially available geotextile fabrics such as Rock Pec® (TenCate), ACECompo™ GS (ACE Geosynthetics), and ACECompo™ PETB (ACE Geosynthetics). Rock Pec is a biaxial geo-composite composed of polyester fibers. ACECompo GS is polyester or polypropylene nonwoven geotextile comprising glass-fiber yarns and ACECompo PETB is a knitted composite comprising nonwoven geotextile with unilateral or bilateral polyester yarns.

In an aspect, pre-fabricated geotextile fabrics include, but are not limited to, commercially the family of commercially available geotextile fabrics known as Mirafi® (TenCate). For example, MPG and MPG4 are glass filament reinforced paving composites comprised of fiberglass filament yarn incorporated into a nonwoven polypropylene paving fabric. MPG composites combine the excellent reinforcing properties of glass filaments with optimum liquid asphalt retention capacity of a mechanically bonded AASHTO nonwoven paving fabric. For example, the N-Series are nonwoven polypropylene geotextiles comprising staple fibers, which combine high durability, high water flow rates, and durability. The S-Series are nonwoven polypropylene geotextiles comprising staple fibers, which provide exceptional results due to high tensile strengths and tremendous physical and hydraulic properties. The RSi Series Woven Geosynthetics are used for varying application needs including: base course reinforcement and subgrade stabilization for road, runway and railway construction; embankment stabilization on soft foundations; reinforcement for mechanically stabilized earth (MSE) structures; liner support, voids bridging, reinforcement over soft hazardous pond closures and other environmental market applications. When superior performance, flexibility, and versatility are necessary, the H2Ri-Series makes the difference for varying application needs including: base course reinforcement and subgrade stabilization for road, runway and railway construction; frost heave/frost boils; embankment stabilization on soft foundations; reinforcement for mechanically stabilized earth (MSE) structures; liner support, voids bridging, reinforcement over soft hazardous pond closures and other environmental market applications. The HP-Series high performance geotextiles are used for base course reinforcement and soil stabilization/reinforcement applications. The HP-Series Geotextiles are specifically designed to provide separation, filtration, and reinforcement for moderate to severe site condition. These geotextiles are extremely versatile, ensuring long-term performance in new roadway construction. The PET-Series woven high-strength polyester geotextiles are used to provide stability and limit differential settlement when constructing embankments over soft soils. The PET-Series geotextiles provide the highest tensile and long term design strength (LTDS) available in any geosynthetic. The PET-Series are comprised of high tenacity and high molecular weight polyester yarns which provide excellent creep resistance, strength, and soil interaction. The FW-Series geotextiles are made of highly UV stabilized monofilament and multifilament yarns that possess unique physical and hydraulic properties not found in other woven or nonwoven geotextiles. With highly durable strengths, consistent pore sizes, high flow rates, and clog resistance, this product is perfect for shorelines and other erosion control applications. The FW-Series geotextiles are used underneath rip rap or concrete revetment systems along inland waterways and coastal shorelines to protect spillways and cut-off drains.

Manufactured Geotextile Fabrics

In an aspect, geotextile fabrics that can be employed in the systems and methods disclosed herein include geotextile fabrics that are manufactured according to a series of required or desired criteria. For example, in an aspect, a disclosed overlay can require the de novo manufacture of a geotextile fabric having specific mechanical properties. Accordingly, methods of manufacturing geotextile fabrics are known to the art.

In an aspect, a geotextile fabric for use in the disclosed systems and methods can be characterized by one or more mechanical properties. For example, a geotextile fabric can be characterized by tensile strength. In an aspect, tensile strength can be measured according to machine direction (MD). In aspect, the MD tensile strength of a geotextile fabric can be about 38 kN/m to about 102 kN/m, about 38 kN/m to about 44 kN/m, about 53 kN/m to about 60 kN/m, about 73 kN/m to about 81 kN/m, or about 93 kN/m to about 102 kN/m. In an aspect, tensile strength can be measured according to cross direction (CD). In aspect, the CD tensile strength of a geotextile fabric can be about 38 kN/m to about 102 kN/m, about 38 kN/m to about 44 kN/m, about 48 kN/m to about 55 kN/m, about 73 kN/m to about 81 kN/m, or about 93 kN/m to about 102 kN/m. In an aspect, the geotextile fabric can have a MD tensile strength of about 38 to about 44 kN/m and a CD tensile strength of about 38 to about 44 kN/m, a MD tensile strength of about 53 to about 60 kN/m and a CD tensile strength of about 48 to about 55 kN/m, a MD tensile strength of about 73 to about 81 kN/m and a CD tensile strength of about 73 to about 81 kN/m, or a MD tensile strength of about 93 to about 102 kN/m and a CD tensile strength of about 93 to about 102 kN/m.

In an aspect, the tensile strength (MD and CD) at 2% can be about 6 kN/m to about 22 kN/m. In an aspect, the tensile strength (MD and CD) at 2% can be about 6 kN/m to about 10 kN/m, about 10 kN/m to about 14 kN/m, about 14 kN/m to about 18 kN/m, or about 18 kN/m to about 22 kN/m. In an aspect, the tensile strength (MD and CD) at 2% can be about 8 kN/m, about 12 kN/m, about 16 kN/m, or about 20 kN/m.

In an aspect, the tensile strength (MD and CD) at 3% can be about 10 kN/m to about 29 kN/m. In an aspect, the tensile strength (MD and CD) at 3% can be about 10 kN/m to about 14 kN/m, about 14 kN/m to about 18 kN/m, about 20 kN/m to about 24 kN/m, or about 25 kN/m to about 29 kN/m. In an aspect, the tensile strength (MD and CD) at 3% can be about 12 kN/m, about 16 kN/m, about 22 kN/m, or about 27 kN/m.

In an aspect, the tensile strength (MD and CD) at 5% can be about 16 kN/m to about 48 kN/m. In an aspect, the tensile strength (MD and CD) at 5% can be about 16 kN/m to about 20 kN/m, about 20 kN/m to about 24 kN/m, about 35 kN/m to about 39 kN/m, or about 44 kN/m to about 48 kN/m. In an aspect, the tensile strength (MD and CD) at 5% can be about 18 kN/m, about 22 kN/m, about 37 kN/m, or about 46 kN/m.

For example, in an aspect, a geotextile fabric can comprise glass filaments in an amount of about 65% by weight to about 80% by weight. In an aspect, a geotextile fabric can comprise glass filament in an amount of about 76% by weight to about 78% by weight. In an aspect, a geotextile fabric can comprise glass filament in an amount of about 77% by weight. In an aspect, the glass filaments of a disclosed geotextile fabric can have a tensile strength at 0° of 655 lbs/in as measured by ASTM D6637. In an aspect, the glass filaments in a disclosed geotextile fabric can have a tensile strength at 90° of 655 kN/m. In an aspect, a geotextile fabric having glass filaments can have a tensile elongation of less than 3%. In an aspect, a geotextile fabric having glass filaments that are temperature resistance, as measured by ASTM D276, of about 752° F. or about 400° C.

In an aspect, the geotextile fabric can comprise polyester or fiberglass yarns or glass filaments. In an aspect, the polyester or fiberglass yarns or glass filaments can be sewn to the upper surface of the geotextile fabric. The polyester or fiberglass yarns or glass filaments can comprise a vertical height of about 1/16" to about 1/2". In an aspect, the polyester or fiberglass yarns or glass filaments can be bi-axially arranged. The biaxial arrangement of yarns or glass filaments can generate a grid of squares. For example, the squares can comprise a width of about 1/2" to about 3", a length of about 1/2" to about 3", or a combination thereof.

In an aspect, the presence of polyester or fiberglass yarns or glass filaments in the geotextile fabric provide a surprising degree of structural stability to the overlay systems disclosed herein. This structural stability was previously unknown to the art. Specifically, these yarns or filaments provide an irregular surface upon which an adhesive can be applied. Such an irregular surface provides a stronger bond between the adhesive and the geotextile fabric than that previously known in the art. This is an advantage over traditional overlay systems, which fail to provide structural reinforcement to the top of the overlay. For example, one of the traditional overlay systems simply uses a non-woven fabric that is adhered to substrate and topped with acrylic color coatings. The horizontal tear strength of this traditional overlay system is determined only by the strength of the non-woven material. If the substrate moves or fluctuates with temperature, for example, the movement or fluctuation of the substrate will cause tears and contracts in the surface of the overlay.

In an aspect, a grid configuration of polyester or fiberglass yarns or glass filaments can also confer one or more advantages to the geotextile fabric. For example, in an aspect, the grid formation of polyester or fiberglass yarns or glass filaments can provide superior stability for an infill layer, can provide horizontal tensile strength for the geotextile fabric, and can provide biaxial strength to the geotextile.

Infills

In an aspect, a disclosed overlay system can comprise one or more infill layers. In an aspect, an infill layer can comprise sand, rubber, or a rubber alternative, or a combination thereof. In an aspect, sand can be silica sand. As known to the art, silica sand is renowned for quality, uniformity, and consistency. In an aspect, silica sand can be 50-80 mesh silica sand. As known to the art, rubber can be crumb rubber, which is typically recycled rubber product generated from tires. In an aspect, an infill layer can comprise a rubber alternative. The art is familiar with rubber alternatives, including but not limited to, Nike grind, coated rubber, styrene butadiene rubber (SBR), ethylene propylene diene monomer (EPDM), thermoplastic polyurethane (TPU), and thermoplastic elastomer (TPE).

In an aspect, a disclosed system can comprise at least one infill layer. In an aspect, a disclosed system can comprise a first infill layer comprising sand. In an aspect, a disclosed system can comprise a first infill layer comprising rubber or a combination of rubber and sand (e.g., crumb rubber and silica sand). In an aspect, a disclosed system can comprise a first infill layer comprising sand, rubber, or a rubber alternative, or a combination thereof.

In an aspect, a disclosed system can comprise two infill layers. In an aspect, a disclosed system can comprise at least two infill layers. In an aspect, a disclosed system can comprise a first infill layer comprising sand (e.g., silica sand) and a second infill layer comprising sand (e.g., silica sand). In an aspect, a disclosed system can comprise a first infill layer comprising rubber or a combination of rubber and sand (e.g., crumb rubber and silica sand) and a second infill layer comprising sand (e.g., silica sand). In an aspect, a disclosed system can comprise a first infill layer comprising sand, rubber, a rubber alternative, or a combination of thereof and a second infill layer comprising sand, rubber, a rubber alternative, or a combination thereof. In an aspect, the infill layers can be the same as one another or the infill layers can be different from one another.

In an aspect, a disclosed system can comprise three infill layers. In an aspect, a disclosed system can comprise at least three infill layers. In an aspect, a disclosed system can comprise a first infill layer comprising rubber or a combination of rubber and sand (e.g., crumb rubber and silica sand), a second infill layer comprising sand (e.g., silica sand), and a third infill layer comprising sand (e.g., silica sand). In an aspect, a disclosed system can comprise a first infill layer comprising sand, rubber, or a combination of sand and rubber, a second infill layer comprising sand, rubber, or a combination of sand and rubber, and a third infill layer comprising sand, rubber, or a combination of sand and rubber. In an aspect, the infill layers can be the same as one another, or the infill layers can be different from one another, or one or more of the infill layers can be the same while one or more of the infill layers can be different.

In an aspect, a disclosed overlay system comprising a first infill layer (e.g., rubber, silica sand, or a combination thereof) can comprise one or more additional infill layers. In an aspect, any additional infill layer can be sand (e.g., silica sand), rubber (e.g., crumb rubber), a rubber alternative, or a combination thereof (e.g., crumb rubber and silica sand).

In an aspect, any disclosed infill layer can also comprise cement. The skilled person can ascertain the climate conditions requiring the use of cement. In an aspect, a disclosed infill layer can comprise rubber and cement. In an aspect, a disclosed infill layer can comprise sand and cement. In an aspect, a disclosed infill layer can comprise sand, rubber, and cement. In an aspect, a disclosed infill layer can comprise sand, rubber, or cement, or any combination thereof. For example, in an aspect of disclosed infill based overlay system, one or more infill layer can comprise silica sand, crumb rubber, and cement. In an aspect, a disclosed infill layer can comprise one or more additional substances, including but not limited to, emulsifiers and adhesives.

In an aspect, a disclosed overlay system can be used to effect a "cushioned court" system. For example, each of the infill layers can comprise a customizable amount of sand, rubber, or rubber alternative, or a combination thereof. For example, a "cushioned court" system can comprise a first infill layer comprising rubber or rubber alternative or rubber or rubber alternative and sand. In an aspect, a "cushioned court" system can also comprise one or more additional infill layers comprising sand, rubber, or a rubber alternative, or a combination thereof. In an aspect, if a softer surface is desired, then the one or more binder layers can contain more rubber or rubber alternative than sand. In an aspect, if a softer surface is desired, then the one or more infill layers can contain only rubber or rubber alternative and no sand.

In an aspect, a disclosed overlay system can be used to effect a "hard court" system. For example, a "hard court" system can comprise an infill layer comprising sand. In an aspect, a "hard court" system can also comprise one or more additional infill layers comprising sand. In an aspect, if a harder surface is desired, then the one or more infill layers can contain more sand than rubber or rubber alternative. In an aspect, if a harder surface is desired, then the one or more infill layers can contain only sand and no rubber or rubber alternative.

Binders

In an aspect, a disclosed overlay system can comprise one or more binder layers. In an aspect, a binder can be manufactured in view of the properties of the geotextile fabric of the disclosed overlay system. As recognized by the skilled person, a binder can be manufactured according to a series of required or desired criteria. Specific criteria for manufacturing a binder can include, for example, but are not limited to, the amount of a reactive solid in the binder, the density of the binder, the pH of the binder, the viscosity of the binder, the glass transition temperature (Tg) of the binder, the minimum film forming temperature (MFFT) of the binder, the particle size of the solid contents of the binder, and the particle charges of the solid contents.

As known in the art, the minimum film forming temperature (MFFT) is the lowest temperature at which a latex, emulsion, or adhesive will uniformly coalesce when laid on a substrate as a thin film. An accurate MFFT value allows the formulation of products that cure correctly under specified application conditions. As known in the art, the glass transition temperature (Tg) is the temperature range where a thermosetting polymer changes from a hard, rigid, or "glassy" state to a more pliable, compliant, or "rubbery" state.

In an aspect, a disclosed binder can comprise a reactive solid in an amount of between about 20% by weight and about 90% by weight, or about 30% by weight and about 80% by weight, or about 40% by weight and about 70% by weight, or about 50% by weight and about 60% by weight. Solid contents are reactive solids. Reactive solids can include, but are not limited to, polyvinyl acetate, latex, styrene butadiene resin, styrene acrylic, styrene acrylic resin, 100% acrylic resin, epoxy ester, oil base (long, short, medium oil alkyds), polyurethane oil base, silicone resin base, silane resin base, silicates, self-dissolvable MMA monomer beads, peroxide initiated MMA monomers, polyurethane prepolymer, epoxy urethane, acrylate epoxy, and UV cured based materials. In an aspect, a reactive solid can be styrene acrylic.

In an aspect, a disclosed binder can comprise a density of about 6 lb per gallon to about 18 lb per gallon, or about 7 lb per gallon to about 17 lb per gallon, or about 8 lb per gallon to about 16 lb per gallon, or about 9 lb per gallon to about 15 lb per gallon, or about 10 lb per gallon to about 14 lb per gallon, or about 11 lb per gallon to about 13 lb per gallon, or about 12 lb per gallon. In an aspect, a disclosed binder can comprise a density of about 9 lb per gallon to about 15 lb per gallon In an aspect, a disclosed binder can comprise a pH of about 3 to a pH of about 11, a pH of about 4 to a pH of about 10, a pH of about 5 to a pH of about 9, a pH of about 6 to a pH of about 8, or a pH of about 7. In an aspect, a disclosed binder can a pH of about 5 to a pH of about 9.

In an aspect, a disclosed binder can comprise a viscosity of about 10,000 centipose to about 60,000 centipose, or about 11,000 centipose to about 55,000 centipose, or about 12,000 centipose to about 50,000 centipose, or about 13,000 centipose to about 45,000 centipose, or about 14,000 centipose to about 40,000 centipose. In an aspect, a disclosed binder can comprise a viscosity of about 12,000 centipose to about 50,000 centipose.

In an aspect, a disclosed binder can comprise a Tg of about −50° C. to about 50° C., or about −40° C. to about 40° C., or about −30° C. to about 30° C., or about −20° C. to about 20° C., or about −10° C. to about 10° C., or about 0° C. In an aspect, a low Tg can help the binder retain a "tacky-ness", which can prevent paint from peeling off the overlay system. In an aspect, the binder can comprise low Tg 100% acrylic. In an aspect, a disclosed binder can comprise a Tg of about −30° C. to about 30° C.

In an aspect, a disclosed binder can comprise a MFFT of about −20° C. to about 40° C., or about −10° C. to about 30° C., or about 0° C. to about 20° C., or about 10° C. In an aspect, a disclosed binder can comprise a MFFT of about 0° C. to about 20° C.

In an aspect, a disclosed binder can comprise a reactive solid having particles sizes of about 0.01 μm to about 12.0 μm, or about 0.02 μm to about 11.0 μm, or about 0.03 μm to about 10.0 μm, or about 0.04 μm to about 9.0 μm, or about 0.05 μm to about 8.0 μm, or about 0.06 μm to about 7.0 μm. In an aspect, a disclosed binder can comprise a reactive solid having particles sizes of about 0.03 μm to about 10.0 μm.

In an aspect, a disclosed binder can comprise a reactive solid having anionic particle charges, cationic particle charges, or both anionic and cationic particle charges.

In an aspect, the skilled person can evaluate the disclosed criteria for preparing a disclosed binder. For example, when preparing a disclosed binder for use with a specific geotextile fabric, the skilled person can ascertain which reactive solid to use as well as the amount of the reactive solid to use. When preparing a disclosed binder for use with a specific geotextile fabric, the skilled person can ascertain the preferred density of the binder, the optimal density of the binder, the resulting density of the binder, or a combination thereof. When preparing a disclosed binder for use with a specific geotextile fabric, the skilled person can ascertain the preferred viscosity of the binder, the optimal viscosity of the binder, the resulting viscosity of the binder, or a combination thereof. When preparing a disclosed binder for use with a specific geotextile fabric, the skilled person can ascertain the preferred Tg of the binder, the optimal Tg of the binder, the resulting Tg of the binder, or a combination thereof. When preparing a disclosed binder for use with a specific geotextile fabric, the skilled person can ascertain the preferred MFFT of the binder, the optimal MFFT of the binder, the resulting MFFT of the binder, or a combination thereof. When preparing a disclosed binder for use with a specific geotextile fabric, the skilled person can ascertain the preferred particle size of a reactive solid, the optimal particle size of a reactive solid, the resulting particle size of a reactive solid, or a combination thereof. When preparing a disclosed binder for use with a specific geotextile fabric, the skilled person can ascertain the preferred particle charges of a reactive solid, the optimal particle charges of a reactive solid, the resulting particle charges of a reactive solid, or a combination thereof.

In an aspect, a binder can comprise about 30% by weight to about 80% by weight of an acrylic having a particle size of about 0.03 μm to about 10 μm and having particles that are anionic or cationic, a density of about 9 lb per gallons to about 15 lb per gallons, a pH of about 5 to about 9, a viscosity of about 12,000 centipose to about 50,000 centipose, a Tg of about −30° C. to 30° C., a MFFT of about 0° C. to about 20° C.

In an aspect, a binder can comprise about 30% by weight of styrene acrylic having a particle size of about 0.03 μm to about 10 μm and having particles that are anionic or cationic, a density of about 9 lb per gallons to about 15 lb per gallons, a pH of about 5 to about 9, a viscosity of about 12,000 centipose to about 50,000 centipose, a Tg of about −30° C. to 30° C., a MFFT of about 0° C. to about 20° C.

In an aspect, a disclosed overlay system can comprise at least one binder layer. In an aspect, a disclosed system can comprise between 1-10 binder layers, between 2-9 binder layers, between 3-8 binder layers, between 4-7 binder layers, or between 5-6 binder layers. In an aspect, a disclosed overlay system can comprise 1, 2, 3, 4, 5, 6, 7, 8, 9, or 10 binder layers.

In an aspect, a disclosed overlay system can comprise one or more binder layers, each binder layer being the same as the other binder layers. In an aspect, a disclosed overlay system can comprise one or more binder layers, each binder layer being different than the other binder layers. In an aspect, a disclosed overlay system can comprise one or more binder layers, some binder layers being the same while other binder layers being different. For example, if an overlay system comprises 6 binder layers, then in an aspect, binder layers 1-2 (which are the same as one another) can be different than binder layers 3-4 (which are the same as one another), which can be different than binder layers 5-6 (which are the same as one another). In an aspect, each binder layer can differ from every other binder layer.

In an aspect of a disclosed overlay system, a binder layer can comprise sand, rubber, a rubber alternative, or a combination thereof. In an aspect, sand can be silica sand. As known to the art, silica sand is renowned for quality, uniformity, and consistency. In an aspect, silica sand can be 50-80 mesh silica sand. As known to the art, rubber can be crumb rubber, which is typically recycled rubber product generated from tires. In an aspect, an infill layer can comprise a rubber alternative. The art is familiar with rubber alternatives, including, but not limited to, Nike grind, coated rubber, styrene butadiene rubber (SBR), ethylene propylene diene monomer (EPDM), thermoplastic polyurethane (TPU), and thermoplastic elastomer (TPE).

In an aspect, for example, a first binder layer can comprise more rubber or rubber alternative than subsequent binder layers. In an aspect, a last binder layer can comprise more sand than previous binder layers. In an aspect, to achieve a desired degree of cushion, each binder layer of a disclosed overlay system can be customized. For example, in an aspect, each of the one or more binder layers can comprise a customizable amount of sand, rubber, or rubber alternative, or a combination thereof. The ability to customize the content of the binder layer confers design flexibility to the overlay system, and distinguishes the disclosed overlay system from other, inferior systems. For example, if a harder surface is desired, then the one or more binder layers can contain more sand than rubber or rubber alternative. If a softer surface is desired, then the one or more binder layers can contain more rubber or rubber alternative than sand. In an aspect, as the number of binder layers increases, the amount of rubber or rubber alternative in each of those binder layers can decrease. In other words, there can be an inverse relationship between the number of the binder layer in the sequence of binder layers and the amount of rubber or rubber alternative in that binder layer. The earlier applied binder layers (e.g., layers 1-2) can have more rubber or rubber alternative than sand or can have all rubber or rubber alternative (e.g., no sand) while the later applied binder layers (e.g., layers 7-8) can have less rubber or rubber alternative or no rubber or rubber alternative (e.g., no rubber).

To ensure customizability, a binder layer can comprise 1-5 parts binder and 1-5 parts sand, rubber, or rubber alternative, or a combination thereof. In an aspect, a binder layer can comprise 2 parts binder and 1 part sand, rubber, or rubber alternative, or a combination thereof. In an aspect, a binder layer can be 2 parts binder and 1 part sand. In an aspect, a binder layer can be 2 parts binder and 1 part rubber. In an aspect, a binder layer can be 2 parts binder and 1 part rubber alternative. In an aspect, a binder layer can be 2 parts binder and 1 part the combination of sand and rubber. In an aspect, a binder layer can be 2 parts binder and 1 part the combination of sand and rubber alternative. In an aspect, concrete can be added to disclosed binder layer. The skilled person can determine how much concrete to add to a disclosed binder layer to achieve the desired performance of the binder layer. In an aspect, water can be added to disclosed binder layer. The skilled person can determine how much water to add to a disclosed binder layer to achieve the desired performance of the binder layer. As the disclosed overlays can be cast-in-place, the binder layers can be prepared at the time of application.

Adhesives

In an aspect, a disclosed overlay system can comprise one or more adhesive layers. For example, in an aspect, an adhesive layer can be applied to an infill layer, or to a seaming material, or to a substrate, or to a layer of geotextile fabric, or a combination thereof. In an aspect, a disclosed overlay system can comprise an adhesive layer between one or more layers to be adhered. In an aspect, a disclosed adhesive can comprise a water-based adhesive or an oil-based adhesive.

In an aspect, a disclosed adhesive can comprise a liquid polymer. Liquid polymers are known to the art and are commercially available. In an aspect, a polymer can be a carboxylated styrene-butadiene emulsion that can adhere to many types of substrates (e.g., Rovene® 4125 (Mallard Creek Polymers)). In an aspect, a polymer can be a self-crosslinking carboxylated styrene-butadiene emulsion that can adhere to many types of substrates (e.g., Rovene® 4170 (Mallard Creek Polymers)). In an aspect, an adhesive can comprise a polyurethane construction adhesive. Polyurethane construction adhesives are known to the art. In an aspect, a polyurethane construction adhesive can be water-resistant and weather-resistant, can set in about 30 minutes, can fully cure in about 24 hours, or a combination thereof.

In an aspect, a disclosed liquid polymer can be applied according to a method known to the art, such as, for example, but not limited to, a pneumatic sprayer.

Resurfacers

In an aspect, a disclosed overlay system can comprise one or more layers of a resurfacer. For example, a resurfacer can be an acrylic resurfacer or a non-acrylic resurfacer. A resurfacer can be water-resistant. In an aspect, a disclosed resurfacer can be an acrylic-based emulsion, which can be combined with silica sand or water or both. Resurfacers are known to the art and are commercially available. For example, a commercially available acrylic resurfacer is NovaSurface (NovaSports USA). Other commercial manufacturers of acrylic resurfacer include SportMaster, Laykold, California Products, and World Class Paints.

In an aspect, a resurfacer can be used to fill in any small irregularities that exist in the overlay following the installation of the one or more binder layers. For example, in an aspect, a disclosed overlay system can comprise one layer of a resurfacer, two layers of a resurfacer, three layers of a resurfacer, or more than 3 layers of a resurfacer. In an aspect, a disclosed overlay system can comprise one or more layers, two or more layers, three or more layers of an acrylic resurfacer.

Colors

In an aspect, a disclosed overlay system can comprise one or more layers of color. For example, a color can be an acrylic color or a non-acrylic color. In an aspect, color can be any acrylic or non-acrylic color of interest. For example, the acrylic or non-acrylic color can be green for tennis court. For example, a disclosed overlay system can comprise one layer of color, two layers of color, three layers of acrylic color, or more than 3 layers of color. For example, a disclosed overlay system can comprise one layer of acrylic color, two layers of acrylic color, three layers of acrylic color, or more than 3 layers of acrylic color.

Playing Lines

In an aspect, a disclosed overlay system can comprise playing lines. In an aspect, an overlay system can comprise playing lines for a tennis court, a pickle ball court, a basketball court, a track (e.g., an oblong running track), a volleyball court, a racquet ball court, or a badminton court, or some other athletic playing surface. Playing lines and dimensions for a tennis court, a pickleball court, and a basketball court are known to those skilled in the art. Representative examples are provided in the figures of the provisional patent application (62/431,955) to which the present application claims the benefit of priority, which is incorporated by reference in its entirety.

Methods

Disclosed herein are methods of installing a binder-based overlay system and methods of installing a non-binder-based overlay system.

Methods of Installing a Binder-Based Overlay System

Disclosed herein are methods of installing binder-based overlay systems.

Disclosed herein is a method of installing a binder-based overlay system comprising correcting one or more deformations in the existing substrate; contacting a layer of geotextile fabric to a surface of a substrate; applying one or more primer layers to a surface of the geotextile fabric; adding one or more binder layers; applying two or more resurfacer layers; applying two or more color layers; and providing playing lines on the surface of the overlay.

Disclosed herein is a method of installing a binder-based overlay system comprising contacting a layer of geotextile fabric to a surface of a substrate; applying one or more primer layers to a surface of the geotextile fabric; adding one or more binder layers; applying two or more resurfacer layers; applying two or more color layers; and providing playing lines on the surface of the overlay.

Disclosed herein is a method of installing a binder-based overlay system comprising correcting one or more deformations in the existing substrate; contacting a layer of geotextile fabric to a surface of a substrate; applying one or more primer layers to a surface of the geotextile fabric; adding one or more binder layers to the one or more primer layers; applying two or more resurfacer layers to the one or more binder layers; applying two or more color layers to the two or more resurfacer layers; and providing playing lines on the surface of the overlay.

Disclosed herein is a method of installing a binder-based overlay system comprising contacting a layer of geotextile fabric to a surface of a substrate; applying one or more primer layers to a surface of the geotextile fabric; adding one or more binder layers to the one or more primer layers; applying two or more resurfacer layers to the one or more binder layers; applying two or more color layers to the two or more resurfacer layers; and providing playing lines on the surface of the overlay.

Disclosed herein is a method of installing a binder-based overlay system comprising: correcting one or more deformations in the existing substrate; contacting a layer of geotextile fabric to a surface of a substrate; applying one or more primer layers to a surface of the geotextile fabric; adding one or more binder layers to the one or more primer layers; applying one or more resurfacer layers to the one or more binder layers; applying one or more color layers to the one or more resurfacer layers; and providing playing lines on the surface of the overlay.

Disclosed herein is a method of installing a binder-based overlay system comprising contacting a layer of geotextile fabric to a surface of a substrate; applying one or more primer layers to a surface of the geotextile fabric; adding one or more binder layers to the one or more primer layers; applying one or more resurfacer layers to the one or more binder layers; applying one or more color layers to the one or more resurfacer layers; and providing playing lines on the surface of the overlay.

Disclosed herein is a method of installing a binder-based overlay system comprising correcting one or more deformations in the existing substrate; contacting a layer of geotextile fabric to a surface of a substrate; applying one or more primer layers to a surface of the geotextile fabric; adding one or more binder layers; applying one or more resurfacer layers; applying one or more color layers; and providing playing lines on the surface of the overlay.

Disclosed herein is method of installing a binder-based overlay system comprising contacting a layer of geotextile fabric to a surface of a substrate; applying one or more primer layers to a surface of the geotextile fabric; adding one or more binder layers; applying one or more resurfacer layers; applying one or more color layers; and providing playing lines on the surface of the overlay.

Disclosed herein is a method of installing a binder-based overlay system comprising partially or substantially adhering a layer of geotextile fabric to the surface of a substrate; applying a primer layer; and adding one or more binder layers.

Disclosed herein is a method of installing a binder-based overlay system, comprising: correcting one or more deformations in an existing substrate; partially or substantially adhering a layer of geotextile fabric to the surface of a substrate; applying a primer layer; and adding one or more binder layers.

Disclosed herein is a method of installing a binder-based overlay system comprising correcting one or more deformations in the substrate; partially or substantially adhering two or more pieces of geotextile fabric to the substrate; seaming two or more pieces of geotextile fabric to the substrate to create a layer of seamed geotextile fabric; applying one or more primer layers; adding one or more binder layers; applying one or more resurfacer layers; applying one or more color layers; and providing playing lines on the surface of the overlay.

Methods of Installing an Infill-Based Overlay System

Disclosed herein are methods for installing infill-based overlay systems. Disclosed herein are methods for installing infill-based overlay systems that can be used indoors or outdoors. In an aspect, a disclosed method on installing an infill-based overlay system can be used to provide a variety of athletic playing surfaces. For example, in an aspect, an infill-based overlay system can be used to provide an indoor or an outdoor tennis court, a pickle ball court, a basketball court, a track (e.g., an oblong running track), a racquet ball court, a volleyball court, or a badminton court.

1. Infill Layer

Disclosed herein a method of installing an infill-based overlay system, comprising: contacting a layer of geotextile fabric to the surface of a substrate; applying an adhesive to a surface of the geotextile fabric; and adding an infill layer to the adhesive layer.

Disclosed herein a method of installing an infill-based overlay system, comprising: contacting a layer of geotextile fabric to the surface of a substrate; applying one or more layers of adhesives; and adding one or more infill layers.

Disclosed herein a method of installing an infill-based overlay system, comprising: contacting a layer of geotextile fabric to the surface of a substrate; applying an adhesive to a surface of the geotextile fabric; and adding an infill layer comprising sand, rubber, or a combination of sand and rubber to the adhesive layer.

Disclosed herein a method of installing an infill-based overlay system, comprising: contacting a layer of geotextile fabric to the surface of a substrate; applying one or more layers of adhesives; and adding one or more infill layers comprising sand, rubber, or a combination of sand and rubber.

Disclosed herein a method of installing an infill-based overlay system, comprising: correcting one or more deformations in the existing substrate; contacting a layer of geotextile fabric to the surface of a substrate; applying an adhesive to a surface of the geotextile fabric; adding an infill layer to the adhesive layer.

Disclosed herein a method of installing an infill-based overlay system, comprising: correcting one or more deformations in the existing substrate; contacting a layer of geotextile fabric to the surface of a substrate; applying an adhesive to a surface of the geotextile fabric; adding an infill layer comprising sand, rubber, or a rubber alternative, or a combination thereof to the adhesive layer.

Disclosed herein a method of installing an infill-based overlay system, comprising: correcting one or more deformations in the existing substrate; contacting a layer of geotextile fabric to the surface of a substrate; applying one or more layers of adhesives; and adding one or more infill layers comprising sand, rubber, or a rubber alternative, or a combination thereof.

Disclosed herein a method of installing an infill-based overlay system, comprising: correcting one or more deformations in the existing substrate; contacting a layer of geotextile fabric to the surface of a substrate; applying one or more layers of adhesives; and adding one or more infill layers comprising sand, rubber, or a rubber alternative, or a combination thereof.

Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof to the first adhesive layer; applying a second adhesive to the infill layer; applying at least one layer of a resurfacer; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof to the first adhesive layer; applying a second adhesive to the infill layer; applying a first layer of a resurfacer; applying a second layer of a resurfacer; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof to the first adhesive layer; applying a second adhesive to the infill layer; applying a first layer of a resurfacer; applying a second layer of a resurfacer; applying at least one layer of color; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof to the first adhesive layer; applying a second adhesive to the infill layer; applying a first layer of a resurfacer; applying a second layer of resurfacer; applying a first layer of color; applying a second layer of color; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding an infill layer comprising sand, rubber, or a rubber alternative, or a combination thereof to the first adhesive layer; applying a second adhesive to the infill layer; applying a first layer of a resurfacer; applying a second layer of resurfacer; applying a first layer of color; applying a second layer of color; applying a third layer of color; and providing playing lines on the surface of the overlay.

Disclosed herein a method of installing an infill-based overlay system, comprising: correcting one or more deformations in the substrate; contacting the substrate with two or more pieces of geotextile fabric; inserting a seaming material under the edges of two adjacent pieces of geotextile fabric; applying a first adhesive layer to the top surface of the seaming material; contacting the two adjacent pieces of geotextile fabric with the adhesive on the top surface of the seaming material; applying pressure to the seam of the two adjacent pieces of geotextile fabric to create a layer of seamed geotextile fabric; applying a second adhesive layer to the surface of the layer of seamed geotextile fabric; adding an infill layer comprising sand, rubber, or a rubber alternative, or a combination thereof to the second adhesive layer; applying a third adhesive layer to the surface of the infill layer; applying at least one layer of a resurfacer; applying at least one layer of color; and providing playing lines on the surface of the overlay.

2. Infill Layers

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying at least one layer of a resurfacer; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying a first layer of a resurfacer; applying a second layer of a resurfacer; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying a first layer of a resurfacer; applying a second layer of a resurfacer; applying at least one layer of color; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a combination of sand and rubber to the second adhesive layer; applying a third adhesive layer to the second infill layer; applying a first layer of a resurfacer; applying a second layer of a resurfacer; applying a first layer of color; applying a second layer of color; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a combination of sand and rubber to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; applying a first layer of a resurfacer; applying a second layer of a resurfacer; applying a first layer of color; applying a second layer of color; applying a third layer of color; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying a first layer of a resurfacer; applying a second layer of a resurfacer; applying a first layer of color; applying a second layer of color; applying a third layer of color; and providing playing lines on the surface of the overlay.

Disclosed herein a method of installing an infill-based overlay system, comprising: correcting one or more deformations in the substrate; contacting the substrate with two or more pieces of geotextile fabric; inserting a seaming material under the edges of two adjacent pieces of geotextile fabric; applying a first adhesive layer to the top surface of the seaming material; contacting the two adjacent pieces of geotextile fabric with the adhesive on the top surface of the seaming material; applying pressure to the seam of the two adjacent pieces of geotextile fabric to create a layer of seamed geotextile fabric; applying a second adhesive layer to the surface of the layer of seamed geotextile fabric; adding a first infill layer comprising sand, rubber, or a rubber alternative, or a combination thereof to the second adhesive layer; applying a third adhesive layer to the surface of the first infill layer; adding a second infill layer comprising sand, rubber, or a rubber alternative, or a combination thereof to the second adhesive layer; applying a fourth adhesive layer to the surface of the second infill layer; applying at least one layer of a resurfacer; applying at least one layer of color; and providing playing lines on the surface of the overlay.

3. Infill Layers

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying at least one layer of a resurfacer; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying a first layer of a resurfacer; applying a second layer of a resurfacer; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying a first layer of a resurfacer; applying a second layer of a resurfacer; applying at least one layer of color; and providing playing lines on the surface of the overlay.

Disclosed herein a method of installing an infill-based overlay system, comprising: contacting a layer of geotextile fabric to the surface of a substrate; applying a first adhesive layer to the surface of the geotextile fabric; adding a first infill layer comprising sand, rubber, or a rubber alternative, or a combination thereof to the first adhesive layer; applying a second adhesive layer to the first infill layer; adding a second infill layer comprising sand, rubber, or a rubber alternative, or a combination thereof to the second adhesive layer; applying a third adhesive layer to the second infill layer; adding a third infill layer comprising sand, rubber, or a rubber alternative, or a combination thereof to the third adhesive layer; applying a fourth adhesive layer to the third infill layer; applying a first layer of a resurfacer; applying a second layer of a resurfacer; applying a first layer of color; applying a second layer of color; and providing playing lines on the surface of the overlay.

Disclosed herein a method of installing an infill-based overlay system, comprising: correcting one or more deformations in the substrate; contacting the substrate with two or more pieces of geotextile fabric; inserting a seaming material under the edges of two adjacent pieces of geotextile fabric; applying a first adhesive layer to the top surface of the seaming material; contacting the two adjacent pieces of geotextile fabric with the adhesive on the top surface of the seaming material; applying pressure to the seam of the two adjacent pieces of geotextile fabric to create a layer of seamed geotextile fabric; applying a second adhesive layer to the surface of the layer of seamed geotextile fabric; adding a first infill layer comprising sand, rubber, or a rubber alternative, or a combination thereof to the second adhesive layer; applying a third adhesive layer to the surface of the first infill layer; adding a second infill layer comprising sand, rubber, or a rubber alternative, or a combination thereof to the second adhesive layer; applying a fourth adhesive layer to the surface of the second infill layer; adding a third infill layer comprising sand, rubber, or a rubber alternative, or a combination thereof to the second adhesive layer; applying a fifth adhesive layer to the surface of the third infill layer; applying at least one layer of a resurfacer; applying at least one layer of color; and providing playing lines on the surface of the overlay.

Steps of Disclosed Methods of Installing Disclosed Overlay Systems

Disclosed herein are steps that are relevant to the disclosed methods of installing an overlay system.

Correcting a Deformity

In an aspect, a deformation can comprise a structural crack, a depression, a low spot, a high spot, a "dead spot", etc. In an aspect, a disclosed method can comprise correcting one or more deformations in the existing substrate. In an aspect, correcting one or more deformations in the existing substrate can comprise cleaning the surface of the substrate and removing any loose debris, such as dust, dirt, gravel, crumbled asphalt, or concrete. In an aspect, removing any loose debris can comprise using a power washer. For example, in an aspect, a discernible crack or depression can be clean and filled with a composition that adheres to the substrate. In an aspect, a composition can comprise a combination of acrylic latex, cement (e.g., Portland cement), and silica sand. In an aspect, such a composition can be referred to as patch binder, a term familiar to the art. In an aspect, a composition can comprise an acrylic emulsion. In an aspect, correcting one or more deformations in the existing substrate can improve the planarity of the playing surface. Correcting one or more deformations in the existing substrate can also improve the uniformity of infill layers, thereby ensuring that an infill layer is saturated with an adhesive.

Cleaning a Substrate

In an aspect, a disclosed method can comprise cleaning the substrate prior to installing the overlay system. For example, if the substrate presents debris, dirt, vegetation, mold, mildew, or fungus, then the substrate can be cleaned. Even in the absence of debris, dirt, vegetation, mold, mildew, or fungus, the substrate can be cleaned. In an aspect, cleaning the substrate can comprise using a broom, a vacuum, a blower, or a pressure washer, or a combination thereof to remove any debris, dirt, vegetation, mold, mildew, or fungus from the substrate including within cracks and other deformations. In an aspect, cleaning the substrate can comprise scrubbing the substrate with brushes, brooms, or other comparable equipment and using a bleach-based solution. In an aspect, cleaning the substrate can comprise thoroughly rinsing (e.g., using a pressure washer) the substrate. Or, in an aspect, cleaning the substrate can comprise a combination of these techniques.

Contacting the Substrate

In an aspect, contacting the substrate with two or more pieces of geotextile fabric can comprise rolling out two or more pieces of geotextile fabric. In an aspect, the two or more pieces of geotextile fabric can be rolled out from the center of any playing surface or court towards the periphery of the playing surface or court. In an aspect, the two or more pieces of geotextile fabric can be rolled out in from the periphery of any playing surface or court towards the center of any playing surface or court. In an aspect, the one or more pieces of geotextile fabric can be rolled out in an alternating fashion.

Figure 3:
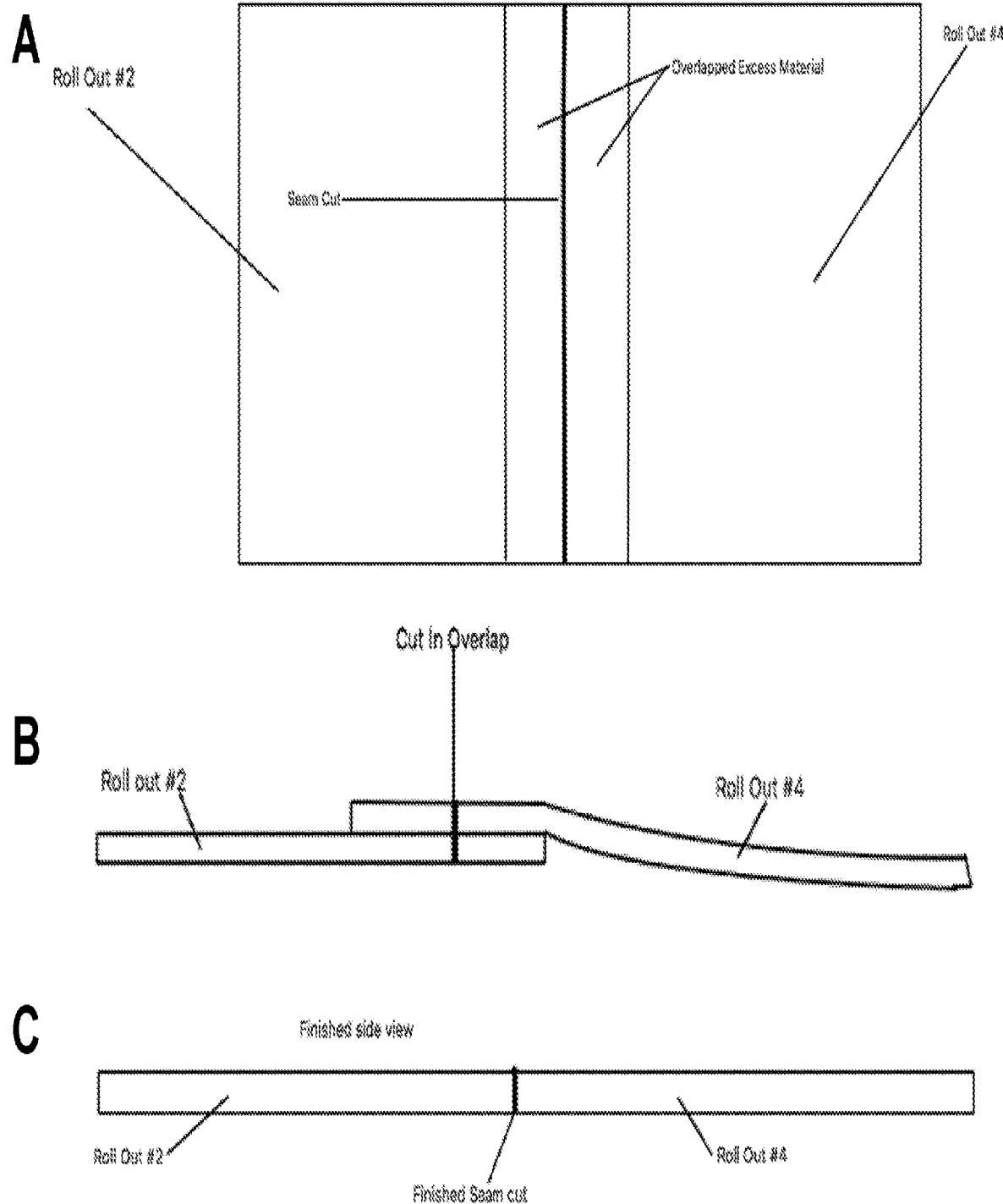
FIG. 3 shows (A) an exemplary rollout pattern of pieces of geotextile fabric, (B) the overlap of two pieces of geotextile fabric, and (C) the seam that will be created following the cut in the overlap shown in (B).

For example, a single tennis court measures approximately 60 feet in width by 120 feet in length. In an aspect, a disclosed method can comprising rolling out a first piece of geotextile fabric along a fence line of 120 feet, rolling out a second piece of geotextile fabric along the edge of the first piece, rolling out a third piece of geotextile fabric along the opposite fence line of 120 feet, and rolling out a fourth piece of geotextile fabric alongside of the third piece of geotextile fabric, allowing any excess material to overlap the previously rolled out second piece of geotextile. In an aspect, a disclosed method can comprise removing any overlap that occurs between two pieces of geotextile fabric. In an aspect, removal of any overlap that occurs between two pieces of geotextile fabric can allow for seaming of those two pieces. FIG. 3 shows (A) an exemplary rollout pattern of pieces of geotextile fabric for a tennis court, (B) the overlap of two pieces of geotextile fabric, and (C) the seam that will be created following the cut in the overlap shown in (B).

In an aspect, a disclosed method can comprising rolling out a first piece of geotextile fabric along the center line of a playing surface, rolling out a second piece of geotextile fabric along the center line of a playing surface (which is also flush to the first piece), rolling out a third piece of geotextile fabric alongside the first piece of geotextile fabric such that it runs along a fence line or the edge of the playing surface, and rolling out a fourth piece of geotextile fabric alongside of the second piece of geotextile fabric such that it runs along the opposite fence line or the opposite edge of the playing surface.

In an aspect, a disclosed method can comprising rolling out a first piece of geotextile fabric alongside a fence line or the edge of a playing surface, rolling out a second piece of geotextile fabric alongside the first piece of geotextile fabric, rolling out a third piece of geotextile fabric alongside the second piece of geotextile fabric, and rolling out a fourth piece of geotextile fabric alongside the third piece of geotextile fabric such that the fourth piece also runs along a fence line or the edge of the playing surface.

In an aspect, the number of pieces of geotextile fabric to be rolled out can vary in accordance with the size of the playing surface or court. For example, in an aspect, a larger court or playing surface can require more pieces of geotextile fabric to be rolled out whereas a smaller court or playing surface can require less pieces of geotextile fabric to be rolled out.

Seaming the Geotextile Fabric

In an aspect, seaming two or more pieces of geotextile fabric to create a layer of seamed geotextile fabric comprises inserting a seaming material under the edges of two adjacent pieces of geotextile fabric; applying a first adhesive layer to the top surface of the seaming material; contacting the two adjacent pieces of geotextile fabric with the adhesive on the top surface of the seaming material; applying pressure to the seam of the two adjacent pieces of geotextile fabric to create the layer of seamed geotextile fabric. In an aspect, a fiberglass mesh can be placed on top of the seam made by two pieces of abutting geotextile fabric. Thus, in an aspect, a completed seam of two pieces of geotextile fabric can comprise a seaming material on the bottom side of the seam and a fiberglass mesh on the top side of the seam.

Figure 5:
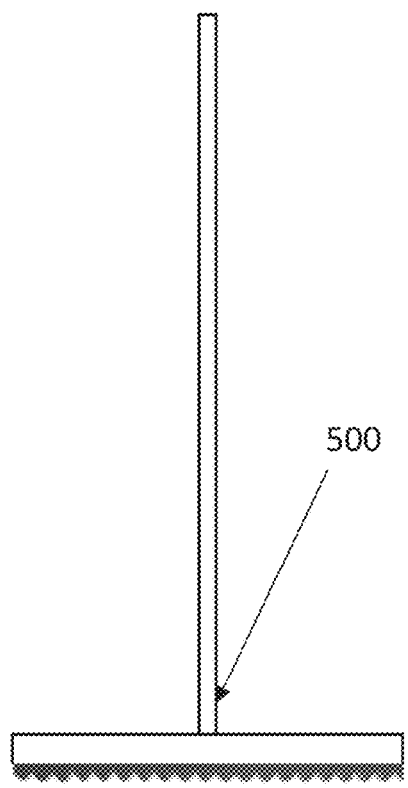
FIG. 5 shows an example of a prior art notched squeegee.

In an aspect, inserting a seaming material under the edges of two adjacent pieces of geotextile fabric can comprise rolling back the edges of both pieces of geotextile fabric to be seamed and positioning the seaming material so that seaming material evenly or about evenly contacts both pieces of geotextile fabric. In an aspect, an adhesive can be applied to the top surface of the seaming material and the edges of both pieces of geotextile fabric can be rolled onto the seaming material. For example, squeegees designed for sport surfacing are commercially available. In an aspect, a squeegee can comprise a rubber blade with a tapered or rounded edge that is about 50 to about 60 durometer. In an aspect, applying an adhesive to the seaming material can comprise using a trowel, such as, for example, a toothed trowel. In an aspect, applying an adhesive to the seaming material can comprise using a notched squeegee or a glue box, both of which are known to the art. An example prior art notched squeegee 500 is shown in FIG. 5. In an aspect, applying an adhesive to the seaming material can comprise applying a thin layer of adhesive.

In an aspect, applying pressure to the seam of the adjoining pieces of geotextile fabric can comprise using a weighted walk behind roller. In an aspect, applying pressure to the seamed geotextile fabric can occur immediately after both pieces of geotextile fabric have been laid upon the seaming material. In an aspect, applying pressure to the seamed geotextile fabric can occur soon thereafter after both pieces of geotextile fabric have been laid upon the seaming material.

In an aspect, the two adjacent pieces of geotextile fabric can be stitched together using threads or filaments known to the art including, but not limited to, polypropylene, polyester, fiberglass, and polyethylene threads or filaments.

Adhering a Layer of Geotextile Fabric

In an aspect of a disclosed method of installing a disclosed overlay system, partially adhering or substantially adhering the geotextile fabric to a substrate can occur after the inserting a seaming material under the edges of two adjacent pieces of geotextile fabric to create a layer of seamed geotextile fabric. In an aspect, partially adhering or substantially adhering the geotextile fabric can comprise adhering a seamed layer of geotextile fabric. The seam itself, however, is not adhered to a substrate.

In an aspect, contacting the substrate with two or more pieces of geotextile fabric or a seamed piece of geotextile fabric can comprise partially adhering or substantially adhering the geotextile fabric to the substrate. In an aspect, partially adhering or substantially adhering the geotextile fabric to the substrate can comprise using an adhesive as disclosed herein (e.g., a liquid polymer such as a carboxylated styrene-butadiene emulsion, a self-crosslinking carboxylated styrene-butadiene, or a polyurethane construction adhesive). In an aspect, using an adhesive to partially adhere or substantially adhere the geotextile fabric to the substrate can comprise applying an adhesive to the perimeter of the edges of a layer of seamed geotextile fabric. In an aspect, using an adhesive to partially adhere or substantially adhere the geotextile fabric to the substrate can comprise applying an adhesive to the perimeter of one or more pieces of geotextile fabric.

Figure 4:
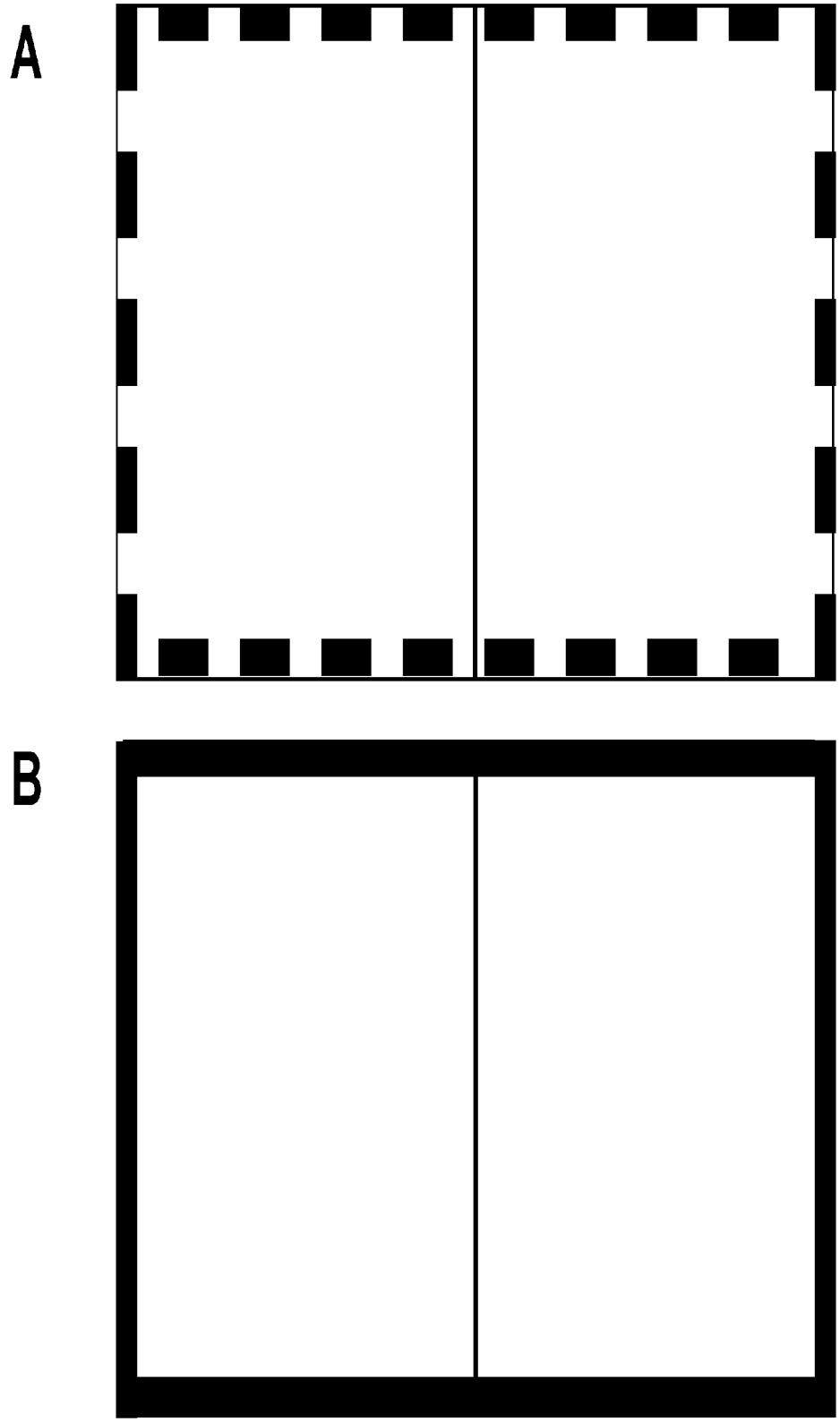
FIG. 4 shows (A) the "on"/"off" pattern of an adhesive (e.g., non-continuous application) around the perimeter of a rectangular shaped overlay, and (B) the continuous application of an adhesive around the perimeter of a rectangular shaped overlay.

Applying can comprise using a trowel, such as, for example, a toothed trowel. In an aspect, applying an adhesive to the perimeter of one or more edges of the layer of seamed geotextile fabric can comprise continuous or non-continuous application of the adhesive. In an aspect, an adhesive can be non-continuously applied to a pre-determined length of the perimeter of the layer of seamed geotextile fabric. In other words, an adhesive can be applied to alternating pre-determined lengths of the perimeter. For example, an adhesive can be applied for to a pre-determined length of the perimeter of the layer of seamed geotextile fabric and not applied to the immediately adjacent pre-determined length of the perimeter. Accordingly, an adhesive can be applied to the entire perimeter of the layer in an alternating "on"/"off" pattern. FIG. 4 shows (A) the "on"/"off" pattern of an adhesive (e.g., non-continuous application) around the perimeter of a rectangular shaped overlay, and (B) shows the continuous application of an adhesive around the perimeter of a rectangular shaped overlay.

In an aspect, the pre-determined length can be about 6" to about 24" of the perimeter, about 10" to about 20" of the perimeter, or about 12" to about 18" of the perimeter of the layer of seamed geotextile fabric. In an aspect, the pre-determined length can be about 6", about 10", about 12", about 18", or about 24" of the perimeter of the layer of seamed geotextile fabric. In an aspect, the pre-determined length can be about 12", about 18", or about 24" of the perimeter of the layer of seamed geotextile fabric. In an aspect, the pre-determined length can be about 12" of the perimeter of the layer of seamed geotextile fabric.

In an aspect, an adhesive can be applied for a pre-determined width from one or more the edges of the layer of the seamed geotextile fabric towards the center of the layer. In an aspect, an adhesive can be applied for a pre-determined width from the perimeter of the layer of the seamed geotextile fabric towards the center of the layer. In an aspect, the pre-determined width can be about 3" to about 30", about 6" to about 27", about 9" to about 24", about 12" to about 21", or about 15" to about 18" of the perimeter of the layer of seamed geotextile fabric. In an aspect, the pre-determined width can be about 3", about 6", about 10", or about 12" of the perimeter of the layer of seamed geotextile fabric. In an aspect, the pre-determined width can be about 6" of the perimeter of the layer of seamed geotextile fabric.

In an aspect, applying an adhesive layer to the surface of the seamed geotextile fabric can comprise using a pneumatic powered spray rig. In an aspect, applying an adhesive layer to an infill layer can comprise using a pneumatic powered spray rig.

In an aspect, partially adhering or substantially adhering the geotextile fabric to the substrate can comprise using a mechanical means of fixation. Mechanical means of fixation are known to those skilled in the art and include, but are not limited to, nails, screws, stakes, hooks, and pins. In an aspect, using a mechanical means of fixation to partially adhere or substantially adhere the geotextile fabric to the substrate can comprise applying the mechanical means of fixation to the perimeter of the edges of a layer of seamed geotextile fabric. In an aspect, using mechanical means of fixation to partially adhere or substantially adhere the geotextile fabric to the substrate can comprise applying the mechanical means of fixation to the perimeter of one or more pieces of geotextile fabric. In an aspect, applying the mechanical means of fixation to the perimeter of one or more edges of the layer of seamed geotextile fabric can comprise continuous or non-continuous application of the mechanical means of fixation. In an aspect, a mechanical means of fixation can be non-continuously applied to a pre-determined length of the perimeter of the layer of geotextile fabric. In other words, the mechanical means of fixation can be applied to alternating pre-determined intervals along the perimeter. In an aspect, the pre-determined interval can be every 3", every 6", every 9 inches, every 12", every 18", or every 24", or between every 3" and 9", or between every 6" and 12", or between every 12" and 18", or between every 18" and 24".

In an aspect of a method of installing a disclosed overlay, contacting the substrate with two or more pieces of geotextile fabric or a seamed piece of geotextile fabric can comprise positioning the geotextile fabric on the substrate but not adhering it to the substrate.

Applying an Adhesive

In an aspect, applying an adhesive layer to the surface of the layer of seamed geotextile fabric can comprise saturating the layer of seamed geotextile fabric and allowing the saturated layer of geotextile fabric to dry. In an aspect, whether the geotextile fabric is dry can be determined by touch. In an aspect, applying an adhesive layer to the surface of any other layer can comprise saturating or coating the other layer with adhesive and allowing saturated or coated other layer to dry. In an aspect, drying can comprise about 1-3 hours. For example, in sunny and/or low-humidity weather, drying can comprise about 1 hour. In an aspect, in cloudy and/or high-humidity weather, drying can comprise about 24 hours. In an aspect, in cloudy and/or high humidity weather, drying can comprise about 24 hours for each layer.

Preparing the Binder Layer

In an aspect, a disclosed method can comprise preparing one or more binder layers. Binder layers are discussed herein and can be prepared so as to satisfy the desired properties of the resulting overlay. A binder layer can be prepare at time of application or some other time prior to application.

Figure 6:
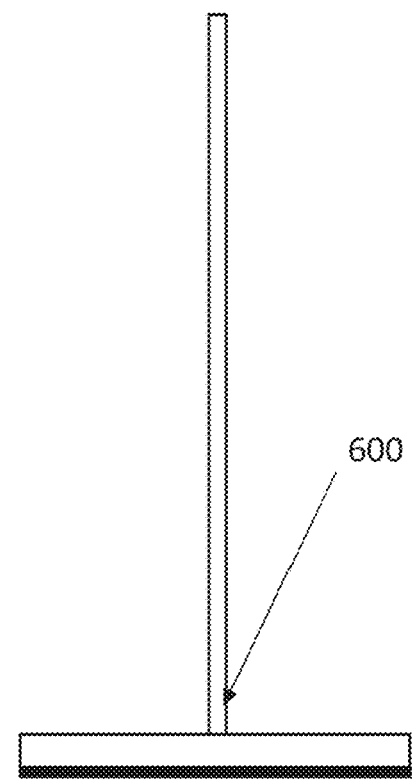
FIG. 6 shows an example of a prior art squeegee.
Figure 7:
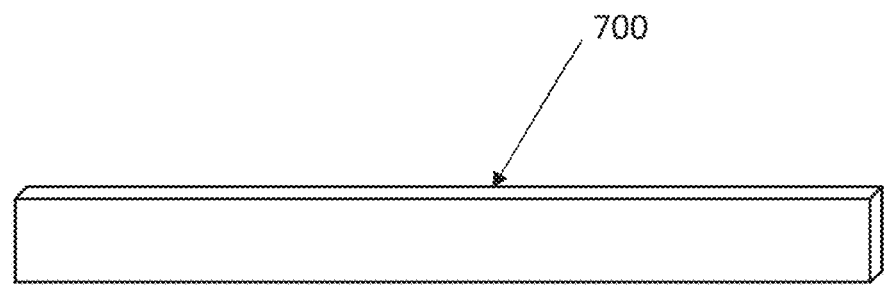
FIG. 7 shows an example of a prior art straight edge or screed.

In an aspect, an infill layer can be applied to the entire surface of a pre-existing layer. In an aspect, an infill layer can be applied by using, for example, a squeegee or a similar instrument known to the art. In an aspect, applying an infill layer can comprise spreading the sand, rubber, or combination of sand and rubber across the entire surface of a pre-existing layer. In an aspect, spreading the sand across the surface of the geotextile fabric can comprising using a squeegee or a similar instrument known to the art or a straight edge or screed, or a combination of both a squeegee and straight edge or screed. In an aspect, a squeegee can be used first and a straight edge or screed can be used second. An example prior art squeegee 600 is shown in FIG. 6, and an example prior art straight edge or screed 700 is shown in FIG. 7.

In an aspect, applying an adhesive layer to infill layer can comprise minimal displacement of the infill layer.

In an aspect, applying an adhesive layer to an infill layer can comprise applying a liberal amount of adhesive. In an aspect, applying an adhesive layer to an infill layer can comprise applying a sufficient amount of adhesive so as to completely saturate or nearly completely saturate the infill layer. In an aspect, a sufficient amount of an adhesive layer can vary according on one or more factors, such as, but not limited to, the depth of the infill layer. In an aspect, the depth of the infill layer can vary according to one or more factors, such as the degree of deformities of the existing substrate.

In an aspect, a disclosed method can comprise applying a first infill layer. In an aspect, a disclosed method can comprise applying a second infill layer. A second infill layer can comprise sand, rubber, or a combination of sand and rubber. In an aspect, a second infill layer can be applied to the entire surface of a pre-existing layer. In an aspect, a second infill layer can be applied by using, for example, a squeegee or a similar instrument known to the art. In an aspect, a second infill layer can be applied for one or more reasons. For example, in an aspect, a second infill layer can be applied if some or all of the first infill layer becomes displaced during installation. In an aspect, a second infill layer can be applied if some or all of the first infill layer is not flush with the fibers of the layer of geotextile fabric. In an aspect, a second infill layer can be applied if some or all of the first infill layer comprises crumb rubber. In an aspect, a second infill layer can be applied if some or all of the first infill layer exceeds ¾" inch in depth. In an aspect, a disclosed method can comprise applying a third infill layer. A third infill layer can comprise sand, rubber, or a combination of sand and rubber. In an aspect, a third infill layer can be applied to the entire surface of a pre-existing layer. In an aspect, a third infill layer can be applied by using, for example, a squeegee or a similar instrument known to the art. In an aspect, a third infill layer can be applied for one or more reasons. For example, in an aspect, a third infill layer can be applied if some or all of the first infill layer and/or the second infill layer becomes displaced during installation. In an aspect, a third infill layer can be applied if some or all of the first infill layer and/or second infill layer is not flush with the fibers of the layer of geotextile fabric. In an aspect, a third infill layer can be applied if some or all of the first infill layer and/or second infill comprises crumb rubber. In an aspect, a third infill layer can be applied if some or all of the first infill layer and/or second infill layer exceeds ¼" inch in depth.

In an aspect, applying an infill layer to a pre-existing layer can comprise using a squeegee or a similar instrument known to the art or a straight edge or screed, or a combination of both a squeegee and straight edge or screed. In an aspect, a squeegee can be used first and a straight edge or screed can be used second.

In an aspect, a disclosed method can comprise applying a first layer of resurfacer, applying a second layer of resurfacer, applying a first layer of color, applying a second layer of color, applying a third layer of color, providing playing lines on the surface of the overlay (e.g., lines for a tennis court, lines for a basketball court), or a combination thereof. In an aspect, applying one or more surface coatings can comprise using a squeegee.

In an aspect, weather can affect the installation of a disclosed overlay system. In an aspect, a disclosed method can be completed in about 2 days, about 3 days, about 4 days, about 5 days, about 6 days, or about 7 days. In an aspect, the amount of time required to complete a step of a disclosed method can be affected by the size of the overlay system, by weather, or by a combination thereof. For example, it if rains during installation of a disclosed overlay system, then the installation can be delayed so that the overlay can thoroughly dry. In an aspect, if the temperature falls below about 50° F., then the installation of a disclosed overlay system can be delayed. Low temperatures can affect the curing of surface coatings and adhesives. In an aspect, if the surface temperature rises above 150° F., then the installation of a disclosed overlay system can be delayed. High surface temperatures can affect the integrity of surface coatings.

Preparing an Infill Layer

In an aspect, a disclosed method can comprise preparing one or more infill layers. Infill layers are discussed herein and can be prepared so as to satisfy the desired properties of the resulting overlay. An infill layer can be prepare at time of application or some other time prior to application.

Advantages of the Disclosed Overlay Systems and Disclosed Methods of Installing Overlay Systems As described herein, the overlay system provides several advantages over the existing art. The disclosed overlay system are customizable and can provide long-term crack repair, cushion, or both for athletic courts and running tracks.

Traditional overlay systems are rolled out and then seamed on the top surface. Accordingly, in traditional overlay systems, the material used for seaming the parts of the overlay systems are exposed to all of the surface traffic of the playing surface. Such exposure can result in premature failure of the surface due to a failed or compromised seam. Conversely, the overlay system disclosed herein comprises a layer of geotextile fabric that is seamed on the bottom surface of the fabric. The seaming along the bottom surface provides a more uniform top surface. In an aspect, only after the pieces of geotextile fabric have been seamed together along the bottom surface and fiberglass mesh has been added to the top of the seam, then the subsequent layers of the disclosed overlay system are installed. Thus, in an aspect, the overlay systems disclosed herein can be considered a monolithically installed surface or cast-in-place surface. Cast-in-place systems confer the advantage of being able to customize the overlay at the time of installation, especially in view of climate considerations. In other words, every layer but for the layer of geotextile fabric is installed as one continuous piece having no seams. Consequently, the overlay system disclosed herein provides superior strength, durability, and flexibility. Moreover, installation of the disclosed overlay system requires lighter materials that can be handled without the use of heavy machinery.

For example, the layer of geotextile fabric of the overlay system disclosed herein can occupy minor depressions in the surface of a substrate (such as a new or existing base comprising concrete, asphalt, gravel, clay, wood, or tile, or a combination thereof).

Several existing systems have a fixed height. This means that a system having a ½ inch thick rubber mat type overlay would simply span across such a depression or low spot. Because the rubber mat type overlay does not physically occupy or fill the depression or the low spot, the spanned depression or low spot becomes a "dead spot" in the completed system. As known to the art, a "dead spot" is an area underneath an overlay (or a cushioned system) wherein the substrate has a depression or a low spot that is not physically occupied by the overlay. A "dead spot" in the substrate can be created with as little as a ⅛" inch depression or low spot in the substrate as compared to surrounding spots of the substrate. A ball that hits a dead spot will act much differently than when the same ball does not hit a dead spot. Dead spots in a playing surface are frustrating to players.

Similarly, if the substrate has a high spot, the same ½ inch thick rubber mat type overlay will simply span across such a high spot. Because the rubber mat type overlay does not adjust to accommodate such a high spot in the substrate, the completed system will retain that high spot, thereby affecting the planarity of the system.

The flexibility of the overlay systems disclosed herein overcome the problems associated with fixed height systems. For example, in an aspect, the geotextile fabric of the disclosed overlay system can be contoured to the surface of the substrate. The flexibility and pliability of the geotextile fabric can help to convey this contouring capability. For example, if a substrate comprises a depression or a low spot, then the depression or the low spot can be corrected during installation over the overlay system. In an aspect, an infill layer can be made slightly thicker at a depression or a low spot. By adjusting an infill layer at a depression or low spot in the underlying substrate, the overlay system disclosed herein can provide better planarity than existing system. Similarly, by adjusting an infill layer at a high spot in the underlying substrate, the overlay system disclosed herein can provide better planarity than existing systems having fixed heights. In an aspect, by occupying or "falling" into minor depressions in the surface of the substrate, the layer of geotextile fabric can provide protection against "dead spots" in the surface. By employing the customizable overlay system disclosed herein, it is not necessary to replace or destroy the existing substrate or damaged existing substrate prior to the installation of the disclosed overlay system. This results in a substantial financial savings. Similarly, the disclosed overlay system can also accommodate cracks that develop following installation in the existing substrate or damaged existing substrate or that develop in a new substrate. Thus, the flexibility of the overlay systems disclosed herein provided improved planarity over existing systems.

As the overlay systems disclosed herein are not entirely adhered to the underlying substrate, the disclosed systems eliminate the need to remove one or more pre-existing layers of color coatings prior to installation. Typically, when existing substrates have 12 or more layers of coatings, there is a very high risk that hydrostatic pressure will push off the layers of coatings, thereby causing cracks in the substrate. By not fully adhering the disclosed overlay to the substrate, any cracks in the underlying substrate will not reflect through the overlay system. Thus, the overlay systems disclosed herein can be considered to be "crack-free" surfaces.

The overlay systems disclosed herein provide both strength and flexibility. For example, the disclosed overlay systems demonstrate surprising horizontal strength that provides a degree of stiffness that spans across any cracks in the underlying substrate while maintaining the vertical flexibility to occupy depressions or low spots in the substrate. This type of vertical flexibility also eliminates any bounce that may occur between the underlying substrate and the disclosed overlay. When a ball hits the playing surface, even a minor bounce will create a hollow sound that users find irksome.

As discussed above, the disclosed overlay systems are customizable. The ability to customize the content of the one or more binder layers or the one or more infill layers confers design flexibility to the overlay system, and distinguishes the disclosed overlay system from other, inferior systems. For example, in an aspect of the binder-based overlay system, each of the one or more binder layers can comprise a customizable amount of sand, rubber, rubber alternative, or a combination thereof. For example, if a harder surface is desired, then the one or more binder layers can contain more sand than rubber or rubber alternative. If a softer surface is desired, then the one or more binder layers can contain more rubber or rubber alternative than sand. Similarly, in an aspect of the infill-based overlay system, each of the one or more infill layers can comprise a customizable amount of sand, rubber, rubber alternative, or a combination thereof. For example, if a harder surface is desired, then the one or more infill layers can contain more sand than rubber or rubber alternative. If a softer surface is desired, then the one or more infill layers can contain more rubber or rubber alternative than sand. Moreover, the flexibility conferred by the customization of the disclosed overlay systems prevents the development of issues of deformities of the underlying substrate from affecting the surface of the overlay system.

In an aspect, the disclosed overlay system can be partially adhered or substantially adhered to the substrate at the perimeter, or the overlay system can be positioned over a substrate but not adhered. Therefore, at any point after installation, the disclosed overlay system can be easily removed from the substrate. For example, the disclosed overlay system can be rolled away from the substrate thereby allowing for inspection of the underlying substrate. Such an inspection can identify one or more issues with the underlying substrate, such as, for example, structural cracks, depressions, low spots, high spots, "dead spots", etc. The one or more issues identified by the inspection can then be redressed without having to entirely replace the overlay system.

Similarly, the flexibility of the disclosed overlay system allows the replacement of net poles, net pole footings, and other accessories (such as, for example, basketball hoops) without having to replace the entire substrate. Rather, the overlay can be rolled up prior to the repairs, and then rolled out and once again adhered to or positioned over the substrate after the repairs.

Moreover, the overlay systems disclosed herein can be advantageously used for temporary sporting events. For example, because the disclosed systems are light-weight and are only partially adhered to the underlying substrate, the disclosed systems can be used to create temporary venues for sporting events. In an aspect, a temporary overlay system disclosed herein can be adhered to the perimeter of an underlying substrate using a means other than a polyurethane construction adhesive (e.g., double-sided tape). Thus, the overlay system disclosed herein can temporarily convert any substrate (such as, for example, a gym floor, a wood floor, a tile floor, or a concrete floor) into a sporting event surface. Following the event, the overlay can be removed thereby exposing the undamaged underlying substrate.

The geotextile fabric of the overlay system can also advantageously provide protection against any thermal shrinking or expanding. Existing overlay systems cannot accommodate thermal expansion and contraction of the underlying substrate. For example, when the substrate experiences heat, the substrate expands. When the underlying substrate expands, the overlay is much more likely to tear or be displaced from its original position. Similarly, when the substrate contracts, the overlay is much more likely to wrinkle. But, as the overlay systems disclosed herein are not fully adhered to the underlying substrate, the disclosed systems can accommodate the substrate's thermal expansion and contraction without tearing, displacing, or wrinkling. Because the disclosed overlay systems are only partially adhered to the substrate, the disclosed systems maintain the surface integrity of the system despite extreme temperatures.

One of the common problems that plague traditional or existing overlay systems, which are fully adhered to the underlying substrate, is the accumulation of hydrostatic pressure (commonly known to the art as vapor). Vapor can build up under any layer that is adhered to the surface. Accumulated or trapped vapor causes bubbles and peelings in the one or more layers of color coating. For example, an asphalt court that has more than twelve coats of color coating applied to its surface is very susceptible to damage caused by trapped vapor. The adhesive applied to these traditional or existing overlay systems prevents the dissipation of this accumulated or trapped vapor, thereby causing damage of the overlay system.

Unlike traditional overlay systems, the disclosed overlay system provides for an "escape route" for accumulated or trapped vapor. Because the geotextile layer of the overlay systems disclosed herein is not fully adhered to the underlying substrate, accumulated or trapped vapor can exit through the existing court surface as it would do normally. Furthermore, accumulated or trapped vapor can also travel horizontally between the disclosed overlay and the underlying substrate to the edge of the overlay and escape. Thus, unlike traditional or existing overlay systems, the customizable overlay systems disclosed here are "breathable" systems.

The lack of a seam on the surface of the overlay system provides another advantage in that the failure of a seam or a joint is unlikely. Similarly, the lack of a seam on the surface of the overlay system provides better planarity. Planarity (or the levelness or the flatness of a surface) is an important consideration of the disclosed overlay system as some governing organizations have established strict planarity guidelines. For example, with respect to planarity, the American Sports Builders Association (ASBA) has stated that "no deviations in court surface shall be more than ⅛" of an inch over 10' feet." Although the pieces of geotextile fabric requiring seaming on the bottom of the fabric, all of the subsequent layers in the disclosed overlay system are added monolithically (i.e., as a solid or unbroken layer).

By building the layers of the disclosed overlay system at the time of installation (i.e., on the surface itself or cast-in-place), the installation process can be modified or customized to make any necessary corrections. For example, as discussed supra, the thickness of an infill layer or a binder layer can be adjusted at the time of installation to accommodate for a depression or a low spot or to accommodate for a high spot in the underlying substrate. Unlike the overlay systems disclosed herein, traditional overlay systems in the art simply cannot perform this type of "on-the-spot" modification or customization.

The disclosed overlay systems are also lightweight, which is another advantage over the overlay systems known in the art. As a lightweight system, the disclosed overlay system can be installed by hand, thereby eliminating the need for heavy equipment or invasive types of machinery during installation that damage property and incur additional expense.

Another advantage of the disclosed overlay systems is that it can be installed in cooler temperatures than other crack repair systems. Traditional overlay systems that are used to repair cracks are installed by gluing and/or adhering various layers of fabric down over a crack. Typically, these traditional overlay systems can only be installed in temperatures that are at least 60° F. and rising at night. In certain geographic areas, the temperatures do not exceed 60° F. for sufficient time to install a traditional overlay system. However, the disclosed overlay system can be installed in cooler temperatures, such as those, for example, below 60° F. For example, unlike traditional overlay systems, the overlay system disclosed herein provides for gluing and adhering that is exposed to some degree of airflow. By not trapping the glue or adhesive during the installation, the overlay system disclosed herein can be installed in temperatures that are at least 50° F. and rising at night. This allows for the installation of the disclosed overlay systems in cooler temperatures.

Another advantage relates to the ability of the disclosed overlay system to be installed across an entire playing court surface (i.e., a basketball court, a tennis court, etc.). Traditional overlay systems are commonly installed to redress spot cracks only. Accordingly, other cracks can occur in spots other than the spot cracks redressed by the traditional overlay system. Using the disclosed overlay system, which can be applied to an entire playing court surface, new cracks or deformities can form and will not reflect through the installed overlay system.

Yet another advantage of the overlay systems disclosed herein is the speed at which an overlay system can be installed. Traditional overlay systems require 3-4 days to complete the repair of cracks, which is due to the fact that layers in between the layers of fabric require significant drying time. Only after these layers have completely dried can the color coatings be applied. Conversely, the overlay systems disclosed herein can be installed in one day and color coatings can be applied the following day. Again, the ease of installation of the overlay systems disclosed herein provide a cost savings to the consumer because labor and travel charges are reduced by the need to be "on-site" for only 1-2 days.

What is claimed is:

1. A method of installing a binder-based overlay system, comprising:

contacting a layer of geotextile fabric to a surface of a substrate;

applying a primer layer to a surface of the geotextile fabric, wherein the primer layer adheres to the geotextile fabric;

applying two or more binder layers over the primer layer, wherein the two or more binder layers adhere to the primer layer, and wherein at least one of the two or more binder layers comprise sand, rubber, rubber alternative, or a combination thereof within one or more of styrene acrylic or styrene butadiene;

applying a resurfacer layer over the one or more binder layers and primer layer;

seaming two adjacent pieces of the geotextile fabric comprising partially adhering or adhering a seaming material across a gap between two adjacent pieces of the geotextile fabric along an underside of the geotextile fabric pieces to seam the two adjacent piece of geotextile fabric, wherein the seaming material overlaps each of the two adjacent geotextile fabric pieces by at least 3 inches from respective adjacent edges, and wherein the gap between two adjacent pieces of the geotextile fabric is seamed along an underside between the geotextile fabric pieces and the substrate but is not seamed along an upper side between the geotextile fabric and the primer layer;

applying fiberglass mesh over the gap between two adjacent pieces of the geotextile fabric, wherein the fiberglass mesh extends over adjacent edges of the pieces of the geotextile fabric defining the gap and is applied prior to or during application of the primer layer, wherein the primer layer is applied with a notched squeegee, and wherein the two or more binder layers are applied with a squeegee or a straight edge/screed; and wherein the geotextile fabric comprises a polyester, fiberglass yarns, or glass filaments sewn to the upper surface of the geotextile fabric and that are bi-axially arranged in a grid formation.

2. A method of installing a binder-based overlay system, comprising:

contacting a layer of geotextile fabric to a surface of a substrate, applying a primer layer to a surface of the geotextile fabric, wherein the primer layer adheres to the geotextile fabric;

applying two or more binder layers over the primer layer, wherein the two or more binder layers adhere to the primer layer, and wherein at least one of the two or more binder layers comprise sand, rubber, rubber alternative, or a combination thereof within one or more of styrene acrylic or styrene butadiene;

applying a resurfacer layer over the one or more binder layers and primer layer; and seaming two adjacent pieces of the geotextile fabric comprising partially adhering or adhering a seaming material across a gap between two adjacent pieces of the geotextile fabric along an underside of the geotextile fabric pieces to seam the two adjacent piece of geotextile fabric, wherein the seaming material overlaps each of the two adjacent geotextile fabric pieces by at least 3 inches from respective adjacent edges, and wherein the gap between two adjacent pieces of the geotextile fabric is seamed along an underside between the geotextile fabric pieces and the substrate but is not seamed along an upper side between the geotextile fabric and the primer layer.

3. The method of claim 2, further comprising applying fiberglass mesh over the gap between two adjacent pieces of the geotextile fabric, wherein the fiberglass mesh extends over adjacent edges of the pieces of the geotextile fabric defining the gap and is applied prior to or during application of the primer layer.

4. The method of claim 3, wherein the primer layer is applied with a notched squeegee.

5. The method of claim 4, wherein the geotextile fabric comprises a polyester, fiberglass yarns, or glass filaments sewn to the upper surface of the geotextile fabric and that are bi-axially arranged in a grid formation.

6. A method of installing a binder-based overlay system, comprising:

contacting a layer of geotextile fabric to a surface of a substrate;

applying a primer layer to a surface of the geotextile fabric, wherein the primer layer adheres to the geotextile fabric;

applying two or more binder layers over the primer layer, wherein the two or more binder layers adhere to the primer layer, and wherein at least one of the two or more binder layers comprise sand, rubber, rubber alternative, or a combination thereof within one or more of styrene acrylic or styrene butadiene;

applying a resurfacer layer over the one or more binder layers and primer layer; and seaming two adjacent pieces of the geotextile fabric comprising partially adhering or adhering a seaming material across a gap between two adjacent pieces of the geotextile fabric along an underside of the geotextile fabric pieces to seam the two adjacent piece of geotextile fabric, wherein seaming the two adjacent pieces of geotextile fabric further comprises:

inserting a self-adhesive seaming material under adjacent edges of two adjacent pieces of geotextile fabric; and applying pressure to the seam of the two adjacent pieces of geotextile fabric to create the layer of seamed geotextile fabric.

7. The method of claim 6, wherein the seaming material overlaps each of the two adjacent geotextile fabric pieces by at least 3 inches from respective adjacent edges.

8. A method of installing a binder-based overlay system, comprising:

contacting a layer of geotextile fabric to a surface of a substrate;

applying a primer layer to a surface of the geotextile fabric, wherein the primer layer adheres to the geotextile fabric;

applying two or more binder layers over the primer layer, wherein the two or more binder layers adhere to the primer layer, and wherein at least one of the two or more binder layers comprise sand, rubber, rubber alternative, or a combination thereof within one or more of styrene acrylic or styrene butadiene; and applying a resurfaces layer over the one or more binder layers and primer layer, wherein a gap between two adjacent pieces of the geotextile fabric is seamed along an underside between the geotextile fabric pieces and the substrate but is not seamed along an upper side between the geotextile fabric and the primer layer.

9. The method of claim 6, wherein the geotextile fabric comprises a polyester, fiberglass yarns, or glass filaments.

10. The method of claim 9, wherein the polyester, fiberglass yarn, or glass filaments are sewn to the upper surface of the geotextile fabric.

11. The method of claim 10, wherein the polyester, fiberglass yarn, or glass filaments are bi-axially arranged in a grid formation.

12. The method of claim 6, wherein the primer layer is applied with a notched squeegee.

13. The method of claim 12, wherein the two or more binder layers are applied with a squeegee or a straight edge/screed.

14. A method of installing a binder-based overlay system, comprising:
   contacting a layer of geotextile fabric to a surface of a substrate;
   applying a primer layer to a surface of the geotextile fabric, wherein the primer layer adheres to the geotextile fabric;
   applying two or more binder layers over the primer layer, wherein the two or more binder layers adhere to the primer layer, and wherein at least one of the two or more binder layers comprise sand, rubber, rubber alternative, or a combination thereof within one or more of styrene acrylic or styrene butadiene;
   applying a resurfacer layer over the one or more binder layers and primer layer; and
   applying fiberglass mesh over a gap between two adjacent pieces of the geotextile fabric, wherein the fiberglass mesh extends over adjacent edges of the pieces of the geotextile fabric defining the gap.

15. The method of claim 14, wherein the fiberglass mesh is applied prior to or during application of the primer layer.

16. The method of claim 15, wherein the primer layer is applied with a notched squeegee, and wherein the two or more binder layers are applied with a squeegee or a straight edge/screed.

17. The method of claim 16, wherein the binder has a viscosity of 12,000 centipose to 50,000 centipose.

* * * * *